United States Patent
Kim et al.

(10) Patent No.: US 9,674,509 B2
(45) Date of Patent: Jun. 6, 2017

(54) MULTI-VIEW 3D IMAGE DISPLAY APPARATUS USING MODIFIED COMMON VIEWING ZONE

(71) Applicant: KOREA INSTITUTE OF SCIENCE AND TECHNOLOGY, Seoul (KR)

(72) Inventors: Sung Kyu Kim, Seoul (KR); Ki Hyuk Yoon, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 539 days.

(21) Appl. No.: 14/097,609

(22) Filed: Dec. 5, 2013

(65) Prior Publication Data
US 2014/0232837 A1    Aug. 21, 2014

(30) Foreign Application Priority Data

Feb. 19, 2013   (KR) .................. 10-2013-0017678

(51) Int. Cl.
*H04N 13/04*     (2006.01)

(52) U.S. Cl.
CPC ..... *H04N 13/0409* (2013.01); *H04N 13/0404* (2013.01); *H04N 13/0477* (2013.01)

(58) Field of Classification Search
None
See application file for complete search history.

(56) References Cited

U.S. PATENT DOCUMENTS

| | | | | |
|---|---|---|---|---|
| 5,661,599 | A * | 8/1997 | Borner | G02B 27/0093 348/E13.029 |
| 8,941,918 | B2 * | 1/2015 | Kim | G02B 27/0093 348/56 |
| 2004/0252374 | A1 * | 12/2004 | Saishu | G02B 27/2214 359/462 |
| 2006/0050385 | A1 * | 3/2006 | Uehara | G02B 27/2214 359/465 |
| 2007/0188517 | A1 * | 8/2007 | Takaki | G02B 27/2214 345/613 |
| 2009/0102916 | A1 * | 4/2009 | Saishu | H04N 13/0048 348/54 |
| 2009/0278936 | A1 * | 11/2009 | Pastoor | G09G 3/003 348/169 |
| 2012/0249530 | A1 * | 10/2012 | Fukushima | G02B 27/2214 345/419 |
| 2015/0015681 | A1 * | 1/2015 | Kim | G02B 27/2214 348/51 |
| 2015/0015686 | A1 * | 1/2015 | de la Barr | H04N 13/0404 348/59 |
| 2015/0036211 | A1 * | 2/2015 | Chen | G02B 27/2214 359/462 |

* cited by examiner

*Primary Examiner* — Dave Czekaj
*Assistant Examiner* — Tyler W Sullivan
(74) *Attorney, Agent, or Firm* — Ladas & Parry LLP

(57) ABSTRACT

Disclosed is a multi-view three-dimensional (3D) image display apparatus using a modified common viewing zone. The multi-view 3D image display apparatus may use a modified common viewing zone between a central viewing zone (common viewing zone) of the multi-view 3D image display apparatus and a central viewing zone (parallel viewing zone) of a 3D image display apparatus employing an integral photography method, or form a common viewing zone at an optimum viewing distance (OVD) of the multi-view 3D image display apparatus and use a modified common viewing zone in an area beyond the OVD.

10 Claims, 29 Drawing Sheets

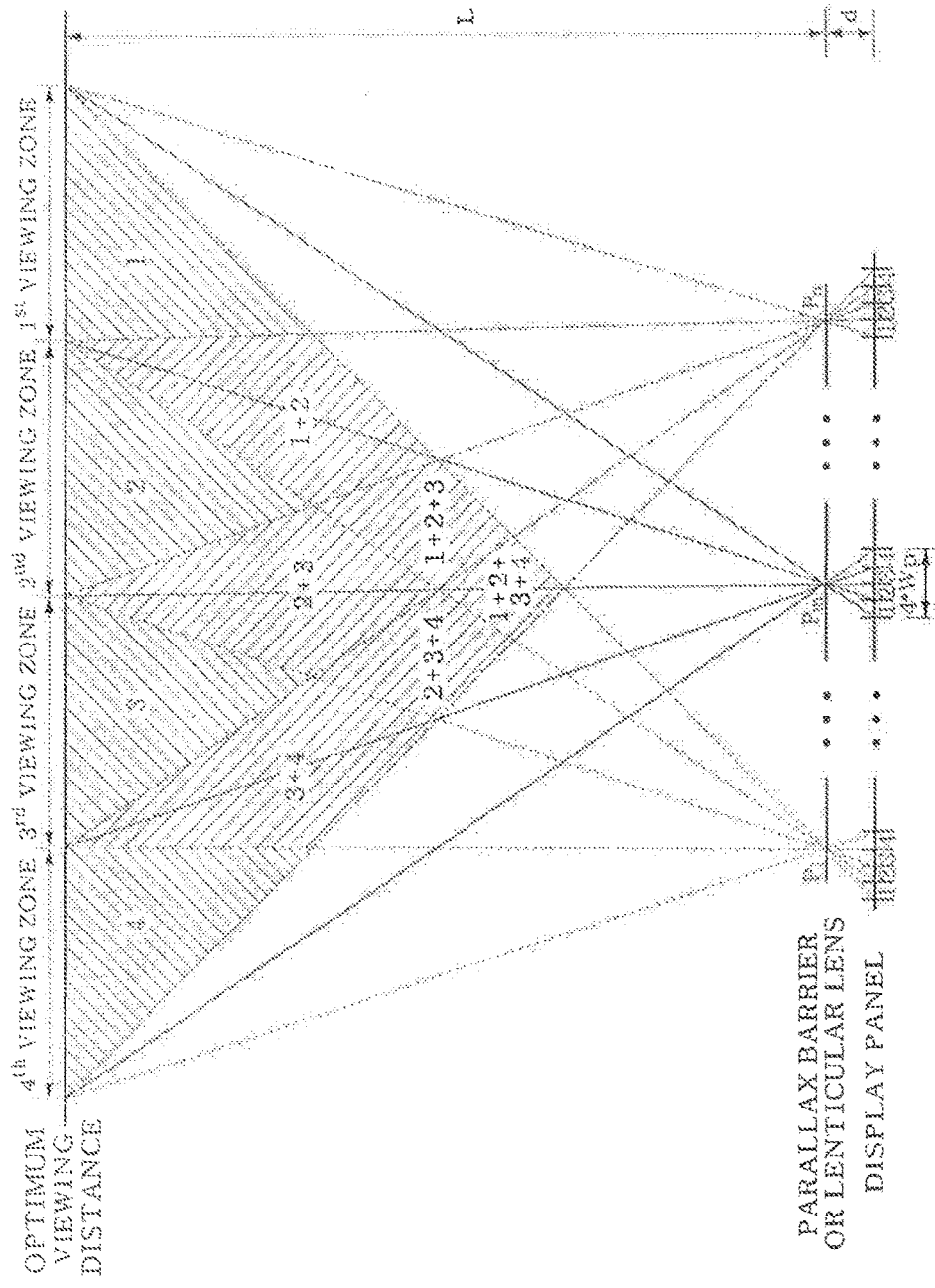

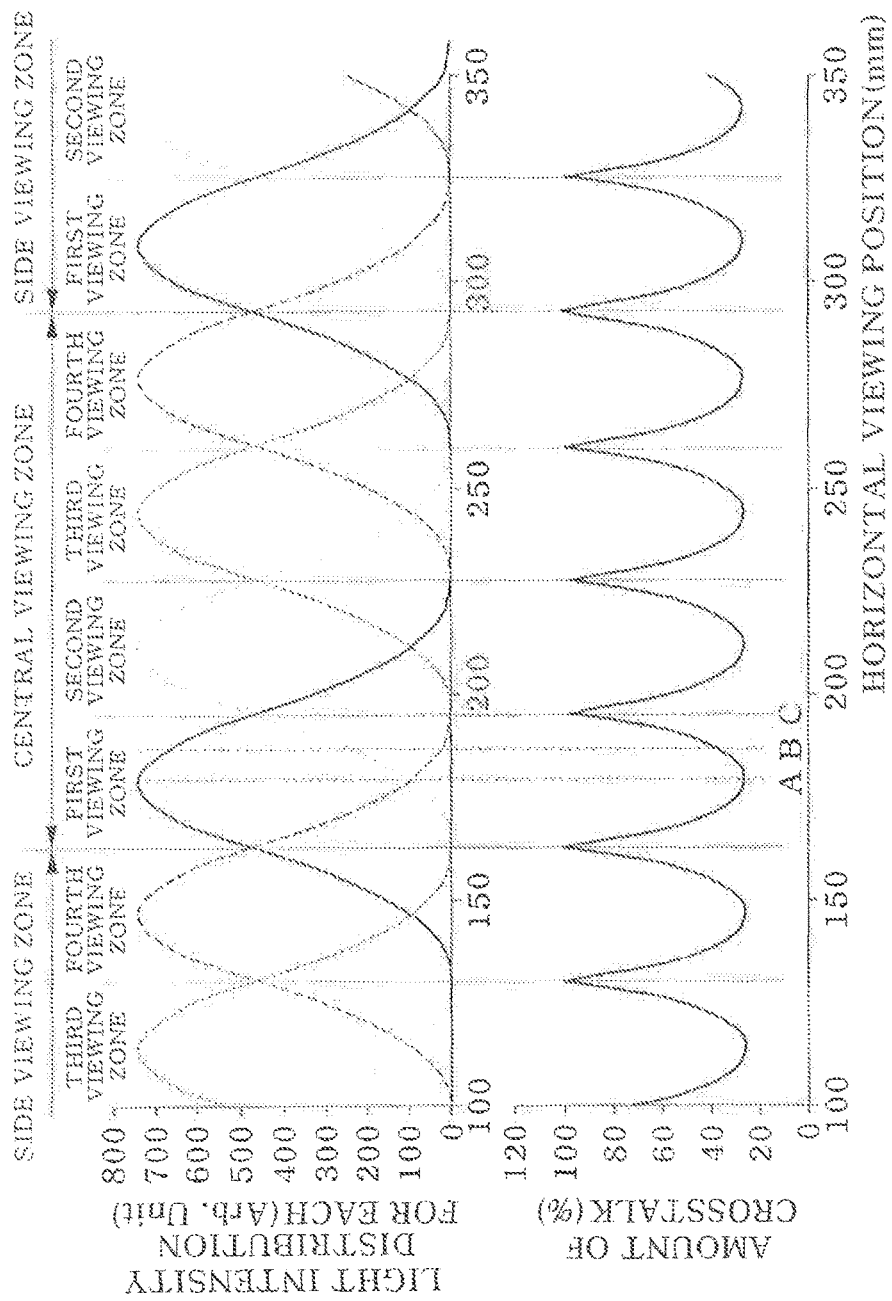

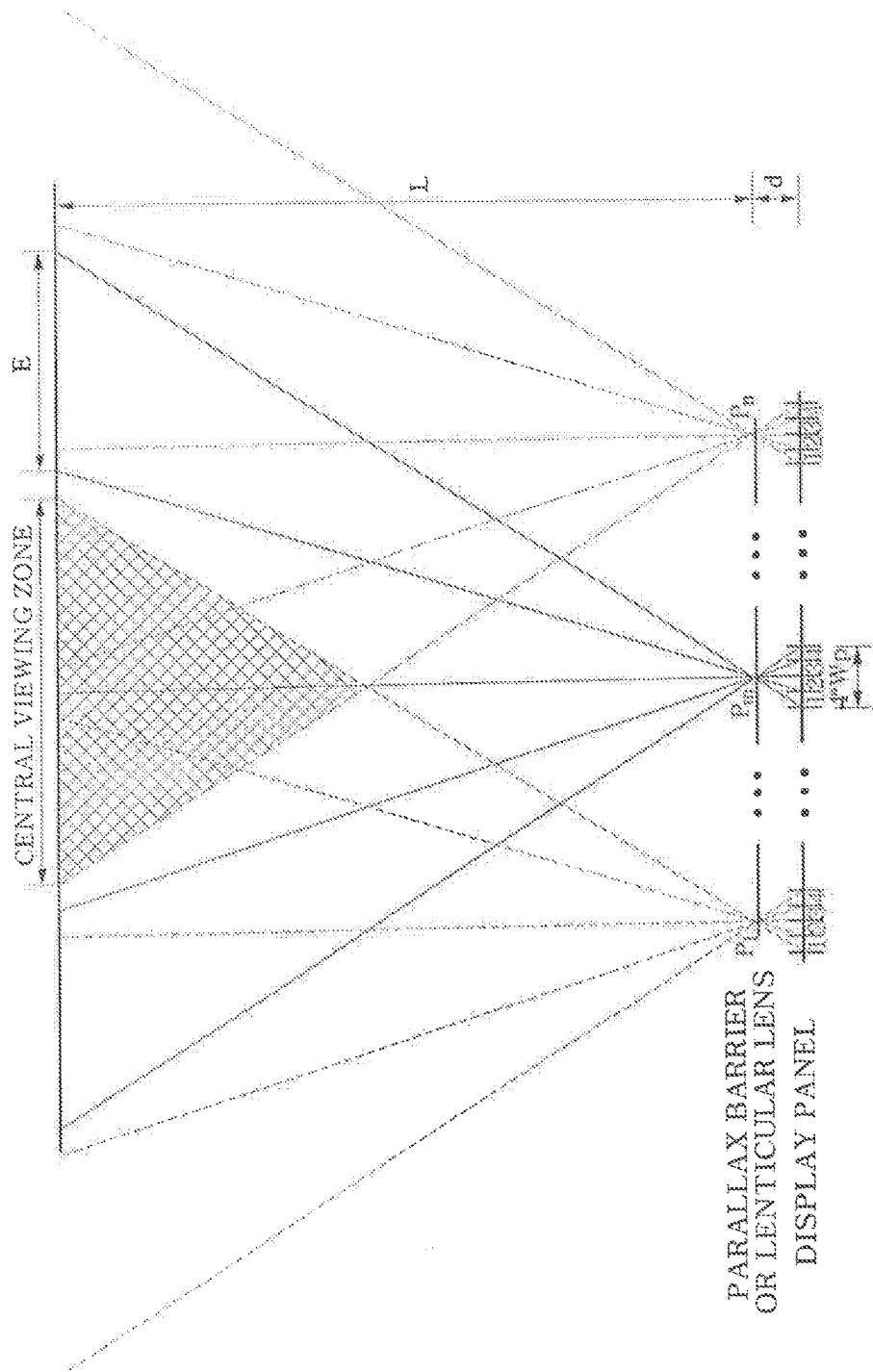

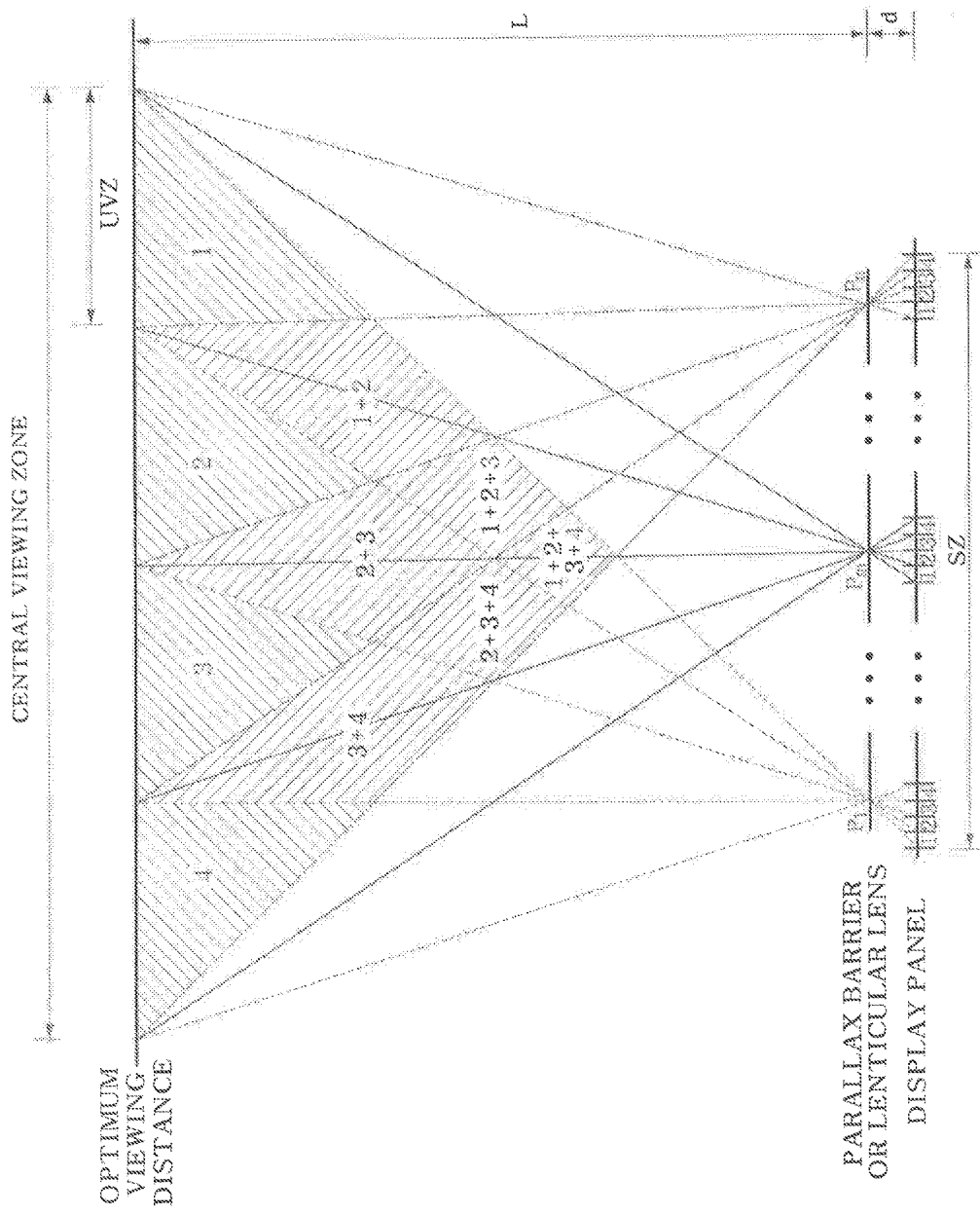

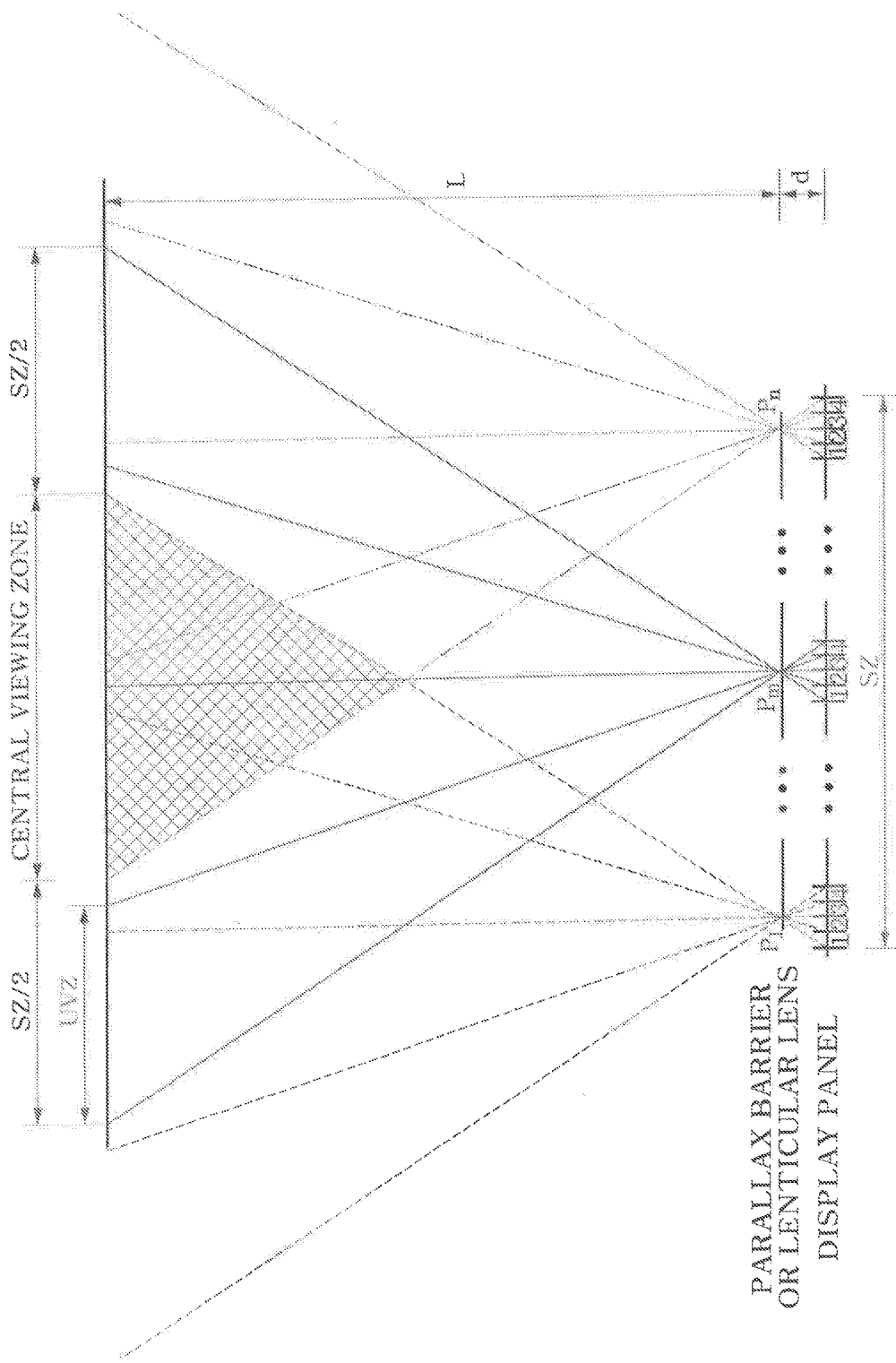

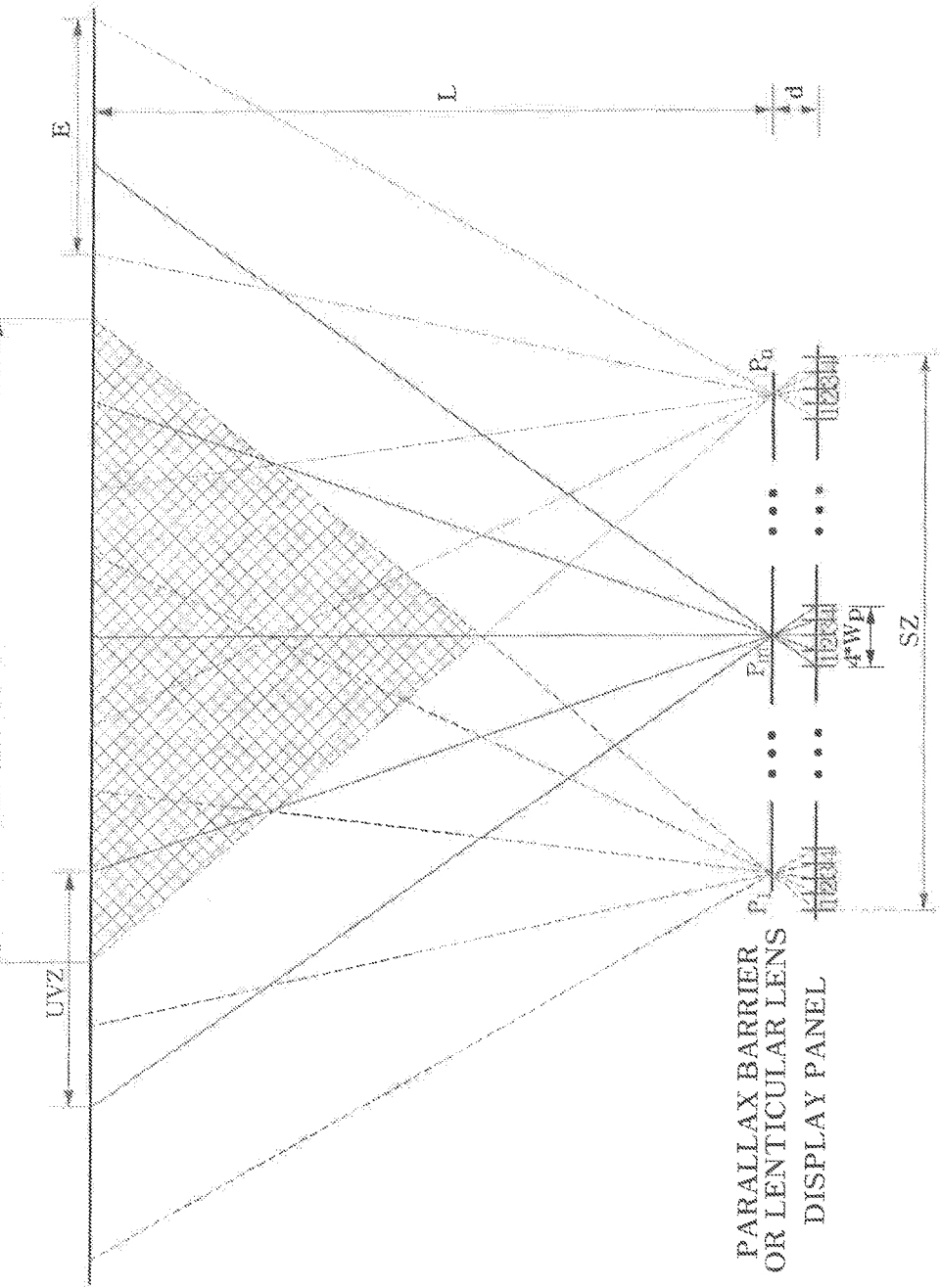

$\alpha = 1$ (GENERAL COMMON VIEWING ZONE DESIGN)

$\alpha = 2$ $\alpha = 4$

α = 8

α = 16

α = 32

$\alpha = 1$ (GENERAL COMMON VIEWING ZONE DESIGN)

$\alpha = 2$ $\alpha = 4$ $\alpha = 8$ $\alpha = 16$ $\alpha = 32$

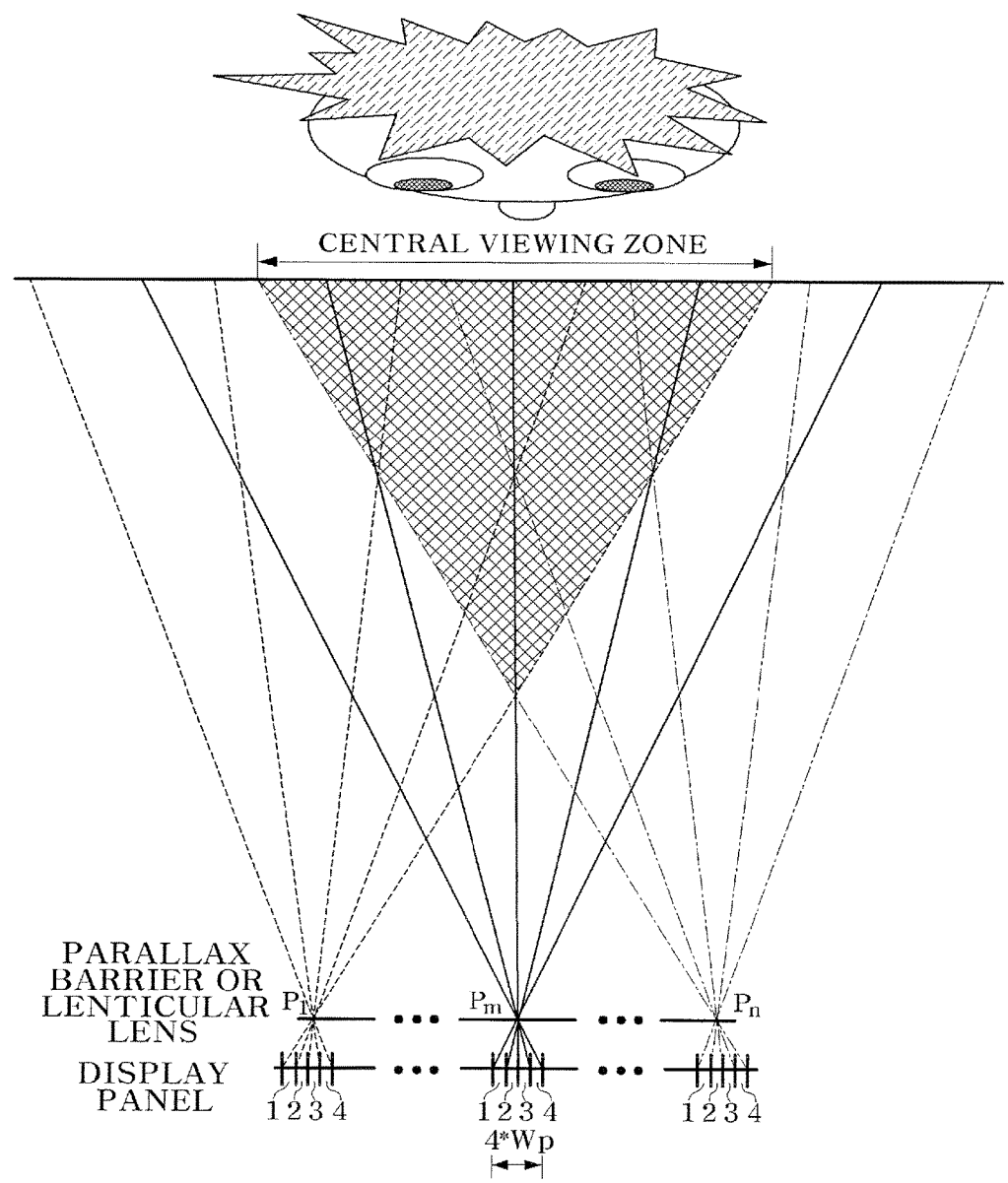

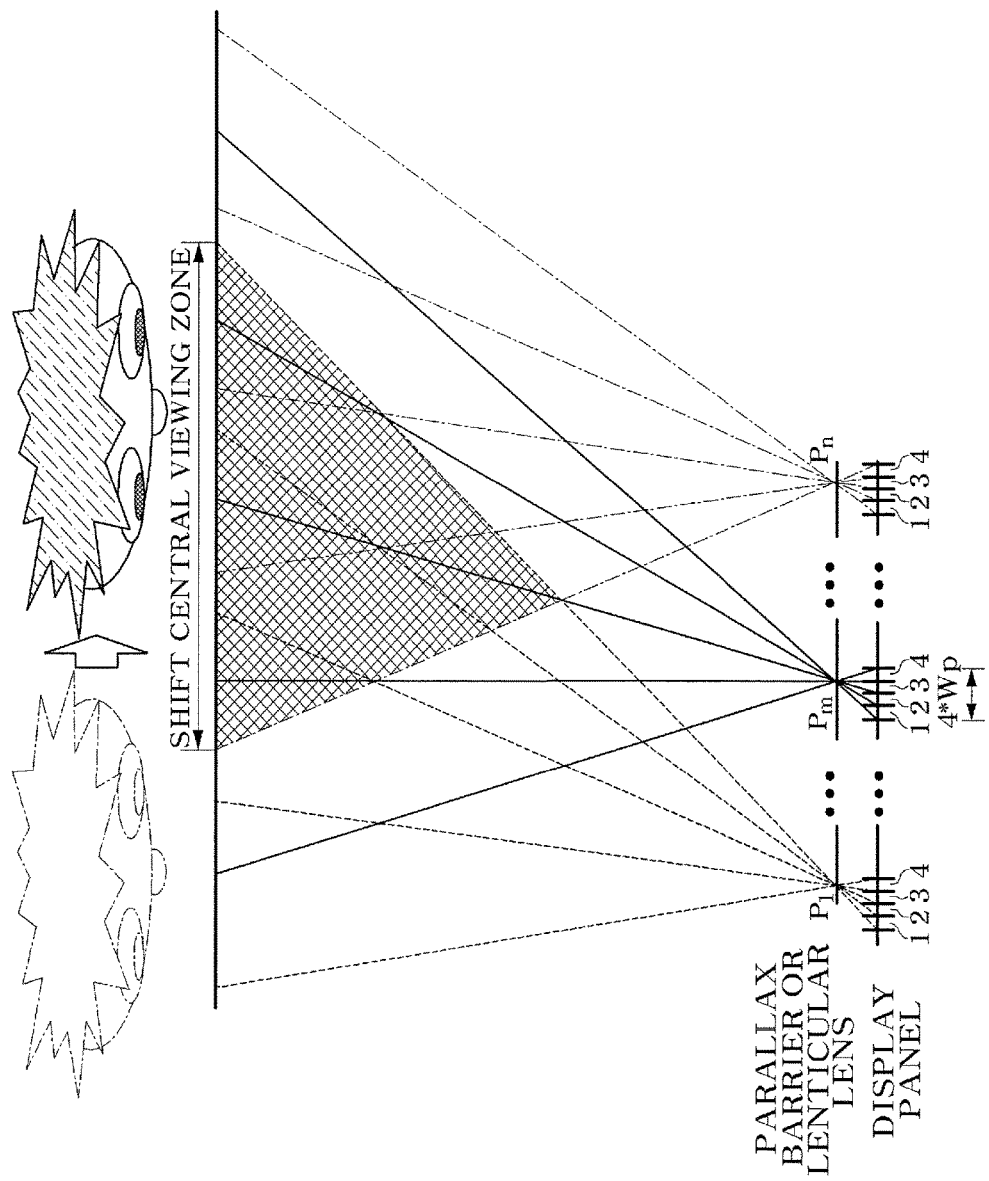

MULTI-VIEW 3D IMAGE DISPLAY APPARATUS USING MODIFIED COMMON VIEWING ZONE

CROSS-REFERENCE TO RELATED APPLICATION

This application claims priority to and the benefit of Korean Patent Application No. 2013-0017678, filed on Feb. 19, 2013, the disclosure of which is incorporated herein by reference in its entirety.

BACKGROUND

1. Field of the Invention

The present invention relates to a multi-view three-dimensional (3D) image display apparatus, and more particularly, to a multi-view 3D image display apparatus which may form a modified common viewing zone corresponding to an intermediate concept of a multi-view 3D image display apparatus and an integrated 3D image display apparatus, or equalize or reduce an amount of crosstalk using a predetermined region after the common viewing zone created at an optimum viewing distance (OVD) of the multi-view 3D image display apparatus.

2. Discussion of Related Art

An autostereoscopic multi-view three-dimensional (3D) image display apparatus may employ a method using an optical plate such as a lenticular lens, a parallax barrier, or the like, or a method using a line light source array, for forming a viewing zone. However, in the 3D image display apparatus using the parallax barrier, the lenticular lens, or the line light source array for forming the viewing zone, in principle, even within the same viewing zone, a crosstalk phenomenon in which a distribution of light and an image of an adjacent viewing zone partially overlap due to movement of the eyes may occur. Thus, it is difficult to implement natural 3D images while a viewer is moving, thereby giving the viewer an uncomfortable feeling.

In the multi-view 3D image display apparatus, an optical plate is designed in such a manner that viewpoint images arranged in pixels on a display panel converge at a specific position at an optimum viewing distance (OVD). Viewing zone arrangement from the position at the OVD designed by such a 3D image design method is referred to as common viewing zone formation. In order to form such a common viewing zone, a period (T) of the optical plate should be designed to be smaller than a value obtained by multiplying a pixel size (Wp) of the display panel by the number of viewpoints (N) of the display panel. That is, "$T<Wp*N$" should be satisfied.

FIG. 1 is a conceptual diagram illustrating a principle of a common viewing zone of a general multi-view 3D image display apparatus. Referring to FIG. 1, in order to implement 3D images, an optical plate such as a lenticular lens or a parallax barrier may be arranged on the front of a display panel. By the optical plate designed according to the pixel size and the number of viewpoints of the display panel, a common viewing zone according to the designed number of viewpoints may be implemented at the OVD position. In FIG. 1, an example in which a common viewing zone is formed according to a four-viewpoint design is shown. However, such a general multi-view 3D image display apparatus may have a problem of a nonuniform amount of crosstalk that changes with horizontal movement (movement parallel to the display panel) of the viewer. Accordingly, only when both pupils of the viewer's eyes are located in the center of a viewpoint may the viewer experience a minimized amount of crosstalk. In addition, there is also a problem of an absolute value of the minimized crosstalk quantity being larger than a general amount of crosstalk in a method using glasses.

More specifically, the cause of these problems will be explained with reference to FIG. 2, which shows light intensity distribution and crosstalk distribution for each viewing zone according to a horizontal position of a viewer in the general multi-view 3D image display apparatus. FIG. 2 illustrates an example of a general multi-view 3D design using the parallax barrier, in which the number of viewpoints is 4, a viewpoint interval is 32.5 mm, and a tilt angle from a vertical direction of an opening of the parallax barrier is $\tan^{-1}(\frac{1}{3})$ (rad). As shown in FIG. 2, viewing zone characteristics of the general multi-view 3D image display apparatus have a problem in that brightness of a corresponding viewpoint image changes depending on the horizontal position of the viewer. As an example, the brightness of the corresponding viewpoint image may be the highest when a pupil (left eye or right eye) of the viewer is positioned at a position A, and the brightness of the corresponding viewpoint image may be reduced when the pupil is positioned at the other positions (position B or C). In addition, the amount of crosstalk with adjacent viewpoints may change depending on the horizontal position. For example, crosstalk may be minimized when a pupil of the viewer is positioned at the position A (the center of a corresponding viewing zone), and may significantly increase as the pupil deviates from the center of the viewing zone. Thus, when a pupil of the viewer is positioned at a position C, the viewer may experience a maximum amount of crosstalk. In addition, an amount of crosstalk of about 20% to 30% may be generated even when the pupil of the viewer is positioned at the center of the viewing zone, and therefore there is a disadvantage of the amount of crosstalk being at least four times larger than in a general glasses type 3D image display apparatus (average amount of crosstalk is 5% or less). In particular, when the pupil of one of the viewer's eyes is positioned in a central viewing zone, and the other is positioned in a side viewing zone, the viewer may experience inverse stereoscopic vision.

As another method of arranging viewpoint images in a space that contrasts with the multi-view 3D image display apparatus, a 3D image display apparatus employing an integral photography method may be used. FIG. 3 is a conceptual diagram for explaining a phenomenon of viewing zone formation of the 3D image display apparatus employing a general integral photography method. For the 3D image display apparatus employing the integral photography method, initially a full parallax disparity method using a two-dimensional (2D) lens array was researched in depth, but now a 3D image display apparatus employing a one-dimensional integral photography method that provides only horizontal parallax disparity information employing a lenticular lens sheet used in the multi-view 3D image display apparatus is being researched. A period (T) of the lenticular lens used in the 3D image display apparatus employing the one-dimensional integral photography method may be the product of a pixel size (Wp) and the number of viewpoints (N) of a display ($T=Wp*N$). That is, the period (T) of the lenticular lens may be an integer multiple (N) of the pixel size (Wp) of the display. This is different from the requirement that the period (T) of the lenticular lens used in the general multi-view 3D image display apparatus be smaller than the integer multiple (the number of viewpoints T) of the pixel size (Wp) (that is, $T<Wp*N$). Due to this difference in design, an OVD that forms the common viewing zone exists at a finite distance in the multi-view 3D image display apparatus, but the common viewing zone is not formed in the 3D image display apparatus employing one-dimensional integral photography method, and therefore the OVD exists at an infinite distance conceptually. Viewing zones of a viewpoint image formed from one period (typically corresponding to a pitch of the lenticular lens) of a set of pixels in which the viewpoint image is arranged in the display panel and a specific optical plate are formed symmetrically with the arrangement of pixels in which the viewpoint image is arranged, about a direction perpendicular to the display panel. Thus, such viewing zones are formed in different positions from viewing zones of a viewpoint image formed from one period of a set of adjacent pixels located in a different position and an adjacent optical plate located in a different position. Such a viewing zone formation method is referred to as parallel viewing zone formation and contrasts with the common viewing zone formation used in the general multi-view 3D image display apparatus.

In such an integral photography method, an amount of crosstalk within a central viewing zone is uniform, but as shown in FIG. 3, there are disadvantages in that a range of the central viewing zone is reduced compared to the multi-view method and an average amount of crosstalk within the central viewing zone is large.

As described above, crosstalk that occurs in the autostereoscopic 3D image display apparatus is an important issue in commercialization. Accordingly, there is demand for a method of greatly reducing crosstalk compared to the existing method, and for an autostereoscopic 3D image display apparatus that can realize the same level of crosstalk as the glasses type method which is not sensitive to a position of a viewer.

SUMMARY OF THE INVENTION

The present invention is directed to a multi-view three-dimensional (3D) image display apparatus using a modified common viewing zone that can ensure uniform brightness of 3D images and realize uniform low crosstalk even though a viewer moves.

According to an aspect of the present invention, there is provided a multi-view three-dimensional (3D) image display apparatus including: a display panel in which pixels are arranged; a parallax separation means or a line light source arranged so as to be spaced apart from the display panel; and a control unit configured to control formation of a modified common viewing zone in which viewing zones for each viewpoint pixel are arranged in a space, by viewpoint images created by the pixels of the display panel and the parallax separation means or the line light source, wherein, in the modified common viewing zone, a first horizontal position of a viewing zone for each first viewpoint pixel created by a first pixel set on the display panel providing the viewpoint image and a first position of the parallax separation means or the line light source corresponding to the first pixel set, and a second horizontal position of a viewing zone for each second viewpoint pixel created by a second pixel set adjacent to the first pixel set and a second position of the parallax separation means or the line light source corresponding to the second pixel set, are not the same.

Here, a pixel set may refer to a bundle of pixels in which N viewpoint images are arranged to correspond to a single opening of each parallax barrier or the line light source, and the viewing zone for each viewpoint pixel may refer to a horizontal area in which viewpoint image (unit viewpoint image) light of a pixel is distributed in a depth direction position of a viewer by the one pixel (unit pixel) within one pixel set and one period (single opening of parallax barrier or lenticular lens) of the parallax separation means or one line light source forming a pair.

In this instance, it is preferable that the parallax separation means be a parallax barrier or a lenticular lens, and a slit interval of the parallax barrier or a pitch T' of the lenticular lens be larger than T of the multi-view 3D image display apparatus using a common viewing zone and smaller than T of a 3D image display apparatus employing an integral photography method.

Also, it is preferable that the slit interval of the parallax barrier or the pitch T' of the lenticular lens be represented as the following Equation, where Wp denotes a pixel width, N denotes the number of viewpoints, E denotes a viewpoint interval, and δE denotes a horizontal position difference of a viewing zone created by a slit of an adjacent parallax barrier or the lenticular lens.

$$T' = \frac{W_p}{W_p + E}(N \times E + \delta E) \quad \text{[Equation]}$$

Also, it is preferable that a pitch T' of the line light source be smaller than T of the multi-view 3D image display apparatus using a common viewing zone and larger than T of a 3D image display apparatus employing an integral photography method.

Also, it is preferable that the pitch T' of the line light source be represented as the following Equation, where Wp denotes a pixel width, N denotes the number of viewpoints, E denotes a viewpoint interval, and δE denotes a horizontal position difference of a viewing zone created by an adjacent line light source.

$$T' = \frac{W_p}{E - W_p}(N * E - \delta E) \quad \text{[Equation]}$$

Also, it is preferable that a light intensity distribution of the viewing zone for each viewpoint pixel be a trapezoidal distribution in which brightness of a middle area of the viewing zone is uniform within a predetermined range.

Also, it is preferable that a line width of the line light source be 30% or less (not including 0) compared to a pitch of the pixels of the display panel.

Also, it is preferable that a width of an opening of the parallax barrier be 30% or less (not including 0) compared to a pitch of the pixels of the display panel.

Also, it is preferable that the multi-view 3D image display apparatus further include a tracking system of a face position or a head position of a viewer, wherein the control unit adjusts a horizontal position of a central viewing zone of the modified common viewing zone by re-arranging the viewpoint image in the pixels according to a position of the viewer, using face or head tracking information provided from the tracking system.

Also, it is preferable that a ratio α of a horizontal position difference (δE) of a horizontal position of the viewing zone for each second viewpoint pixel to a horizontal position of the viewing zone for each first viewpoint pixel be 8 or larger.

Also, it is preferable that Δ Crosstalk, a change width of an amount of crosstalk within the modified common viewing zone be 10% or less.

According to another aspect of the present invention, there is provided a multi-view 3D image display apparatus including: a display panel in which pixels are arranged; a parallax separation means or a line light source arranged so as to be spaced apart from the display panel; and a control unit configured to control formation of a modified common viewing zone in which viewing zones for each viewpoint pixel are arranged in a space, by viewpoint images created by the pixels of the display panel and the parallax separation means or the line light source, wherein the modified common viewing zone has a range up to a position at which a size of each unit viewing zone in a depth direction is equal to an average binocular distance of a viewer from an optimum viewing distance (OVD).

In this instance, the modified common viewing zone has a range up to a position at which the size of each unit viewing zone in the depth direction is equal to the average binocular distance of the viewer from a farthest point of the common viewing zone beyond the OVD.

Here, the unit viewing zone may refer to a distance between centers of two adjacent viewpoints formed in a depth direction position of a viewer by two adjacent pixels within one pixel set and one period (single opening of parallax barrier or lenticular lens) of the parallax separation means or one line light source forming a pair. The viewing zone for each adjacent viewpoint pixel may be formed by moving horizontally by a defined unit viewing zone, but an area of a horizontal position at which the viewing zone for each viewpoint pixel is distributed may be larger than the unit viewing zone.

In this instance, it is preferable that a light intensity distribution of the viewing zone for each viewpoint pixel be a trapezoidal distribution in which brightness of a middle area of the viewing zone is uniform within a predetermined range.

Also, it is preferable that a line width of the line light source be 30% or less (not including 0) compared to a pitch of the pixels of the display panel.

Also, it is preferable that a width of an opening of the parallax barrier be 30% or less (not including 0) compared to a pitch of the pixels of the display panel.

Also, it is preferable that the multi-view 3D image display apparatus further include a tracking system of a face position or a head position of the viewer, wherein the control unit adjusts a horizontal position of a central viewing zone of the modified common viewing zone by re-arranging the viewpoint image in the pixels according to a position of the viewer, using face or head tracking information provided from the tracking system.

Also, it is preferable that a ratio $\alpha$ of a horizontal position difference ($\delta E$) of a horizontal position of a viewing zone for each adjacent viewpoint pixel created through an adjacent parallax barrier, a lenticular lens, or the line light source to a horizontal position of the viewing zone for each predetermined viewpoint pixel be 8 or larger.

Also, it is preferable that $\Delta$ Crosstalk, a change width of an amount of crosstalk within the modified common viewing zone be 10% or less.

Also, it is preferable that a size of a horizontal range of a central viewing zone at the OVD be larger than a horizontal size of the display panel. Here, unlike a central viewing zone of the multi-view 3D image display apparatus using a general common viewing zone, the central viewing zone may be defined as a size of a horizontal area in which central viewing zone ranges of the 3D image display apparatus using the modified common viewing zone and the 3D image display apparatus employing the integral photography method do not form the common viewing zone but there is no inverse stereoscopic vision at a viewing position.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a conceptual diagram explaining a principle of a common viewing zone of a general multi-view three-dimensional (3D) image display apparatus according to conventional art;

FIG. 2 is a graph explaining light intensity distribution and an amount of crosstalk for each viewing zone at a viewer position of a general multi-view 3D image display apparatus according to conventional art;

FIG. 3 is a conceptual diagram explaining a principle of viewing zone formation of a 3D image display apparatus employing a general integral photography method according to conventional art x $P_1$, $P_m$, $P_n$ of FIG. 3 shows an optical center position of an opening of a plurality of parallax barriers or an optical center position of a plurality of lenticular lens ($P_1$, $P_m$, $P_n$ of FIG. 1, FIG. 4-6, FIG. 17, FIG. 19, FIG. 22, and FIG. 24-25 also have the same meaning as those of FIG. 3);

FIGS. 4A, 4B, and 4C are conceptual diagrams explaining a modified common viewing zone range according to a first embodiment of the present invention;

FIG. 24 is a conceptual diagram explaining that the degree of freedom at a position where a viewer is increased compared to an integral photography method, by a multi-view 3D image display apparatus using a modified common viewing zone created within an OVD; and FIG. 25 is an exemplary diagram showing a case of performing face tracking in a 3D image display apparatus using a modified common viewing zone created within an OVD.

DETAILED DESCRIPTION OF EXEMPLARY EMBODIMENTS

Figure 5:
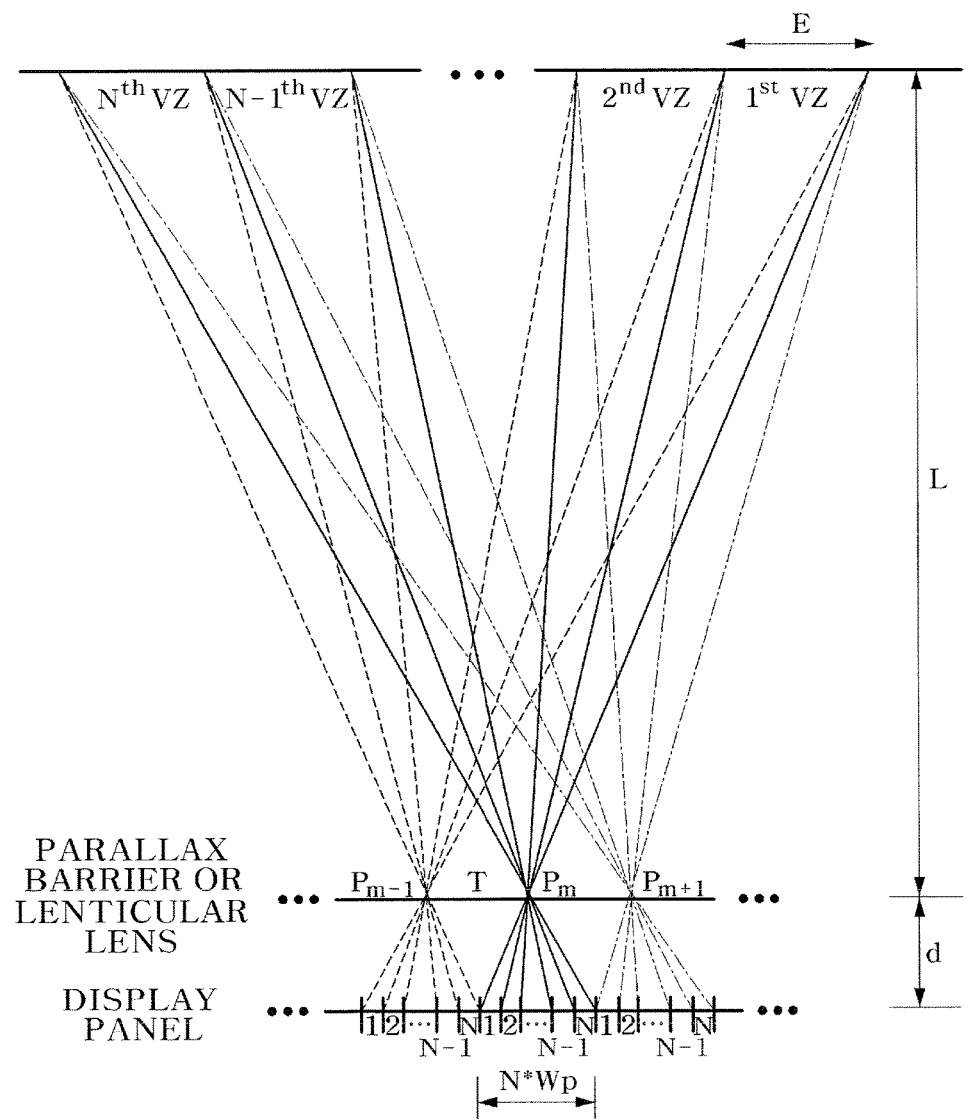
FIG. 5 is a conceptual diagram explaining common viewing zone formation conditions of a general multi-view 3D image display apparatus using an optical plate.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

According to a first embodiment of the present invention, a modified common viewing zone between a central viewing zone (common viewing zone) of a multi-view three-dimensional (3D) image display apparatus and a central viewing zone (parallel viewing zone) of a 3D image display apparatus employing an integral photography method may be used. According to a second embodiment of the present invention, a common viewing zone can be created at an optimum viewing distance (OVD) of the multi-view 3D image display apparatus and a modified common viewing zone in an area beyond the OVD may be used.

(First Embodiment)

A concept of the modified common viewing zone according to a first embodiment of the present invention will be described with reference to FIGS. 4A to 4C. FIGS. 4A to 4C are conceptual diagrams explaining a modified common viewing zone range according to a first embodiment of the present invention. FIG. 4A shows a size of a central viewing zone (common viewing zone) of the multi-view 3D image display apparatus, and "N (the number of viewpoints)*UVZ (unit viewing zone)" may be derived from this. FIG. 4B shows a size of a central viewing zone of the 3D image display apparatus employing the integral photography method, and "N*UVZ–SZ (size of horizontal display)" may be derived from this. Thus, the size of the central viewing zone of the 3D image display apparatus employing the integral photography method is significantly smaller than the size of the central viewing zone (common viewing zone) of the multi-view 3D image display apparatus. A range of the central viewing zone of the 3D image display apparatus using the modified common viewing zone according to the first embodiment of the present invention is the same as that of FIG. 4C, and this may be represented as "N*UVZ–SZ<central viewing zone range<N*UVZ". Since the 3D image display apparatus using such a modified common viewing zone uses averaged crosstalk in the same manner as the integral photography method, there is an advantage of an amount of crosstalk within the central viewing zone being uniform. Unlike the central viewing zone range of the multi-view 3D image display apparatus using a general common viewing zone, the central viewing zone ranges of the 3D image display apparatus employing the integral photography method and the 3D image display apparatus using the modified common viewing zone do not form the common viewing zone, but may be defined as a size of a horizontal area without inverse stereoscopic vision at a viewing position.

Hereinafter, formation conditions of the central viewing zone of the 3D image display apparatus using the modified common viewing zone will be described with reference to FIGS. 5 to 8.

Figure 6:
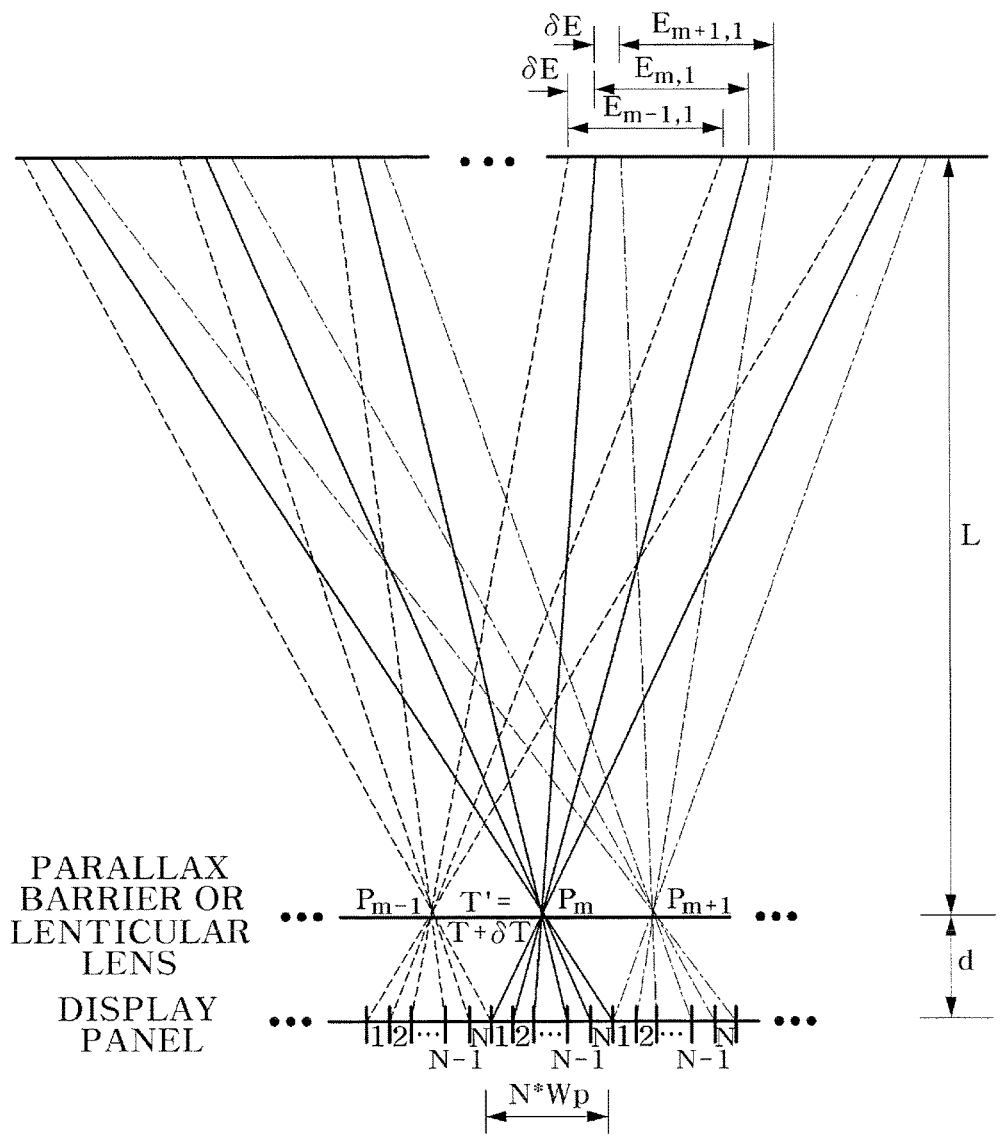
FIG. 6 is a conceptual diagram comparing and explaining a modified common viewing zone formation condition of a multi-view 3D image display apparatus according to a first embodiment of the present invention.
Figure 7:
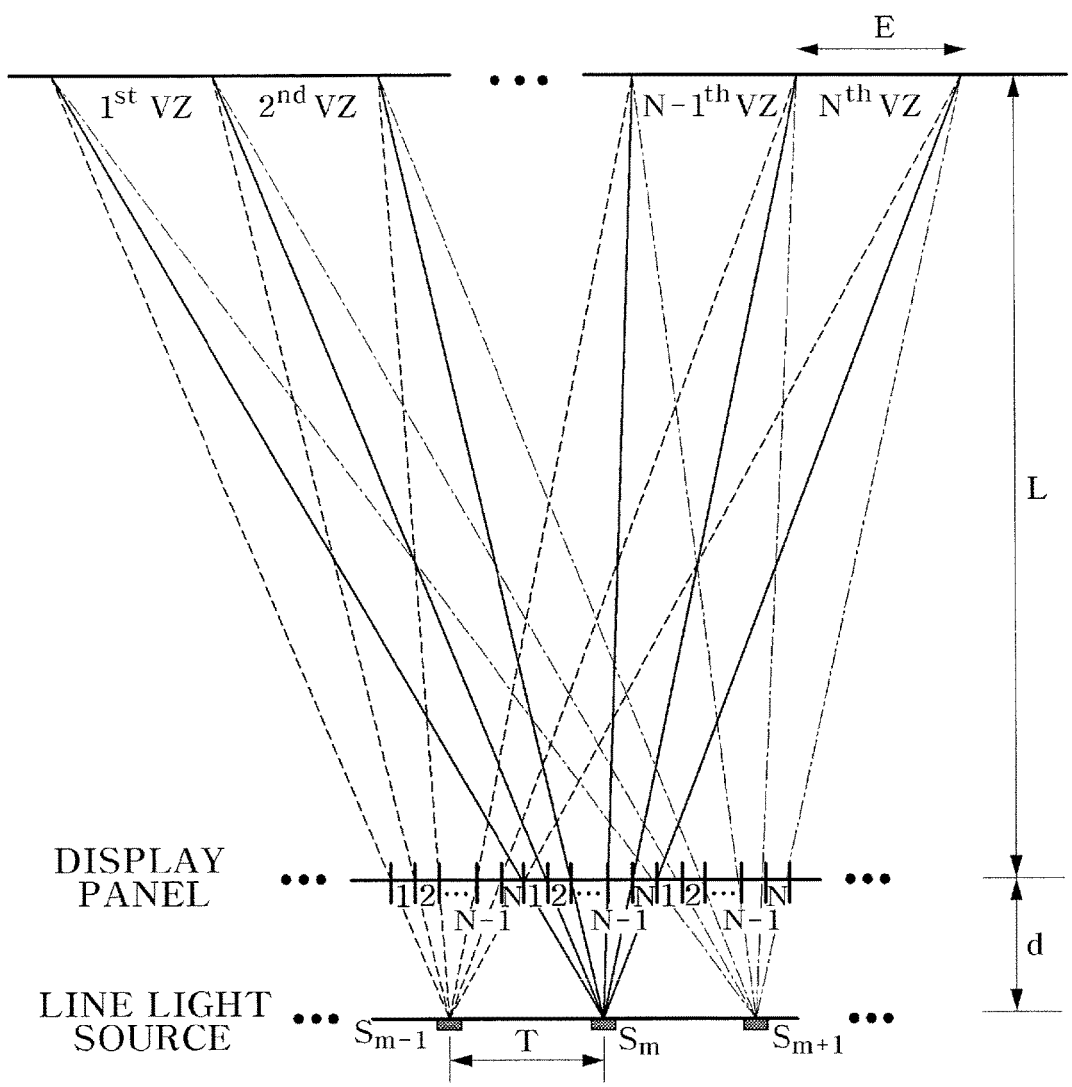
FIG. 7 is a conceptual diagram explaining common viewing zone formation conditions of a general multi-view 3D image display apparatus using a line light source where $S_{m-1}$, $S_m$, and $S_{m+1}$ of FIG. 7 shows a plurality of line sources arranged behind a display panel. ($S_{m-1}$, $S_m$, and $S_{m+1}$ of FIG. 8, FIG. 18, and FIG. 20 also have the same meaning of those of FIG. 7)
Figure 8:
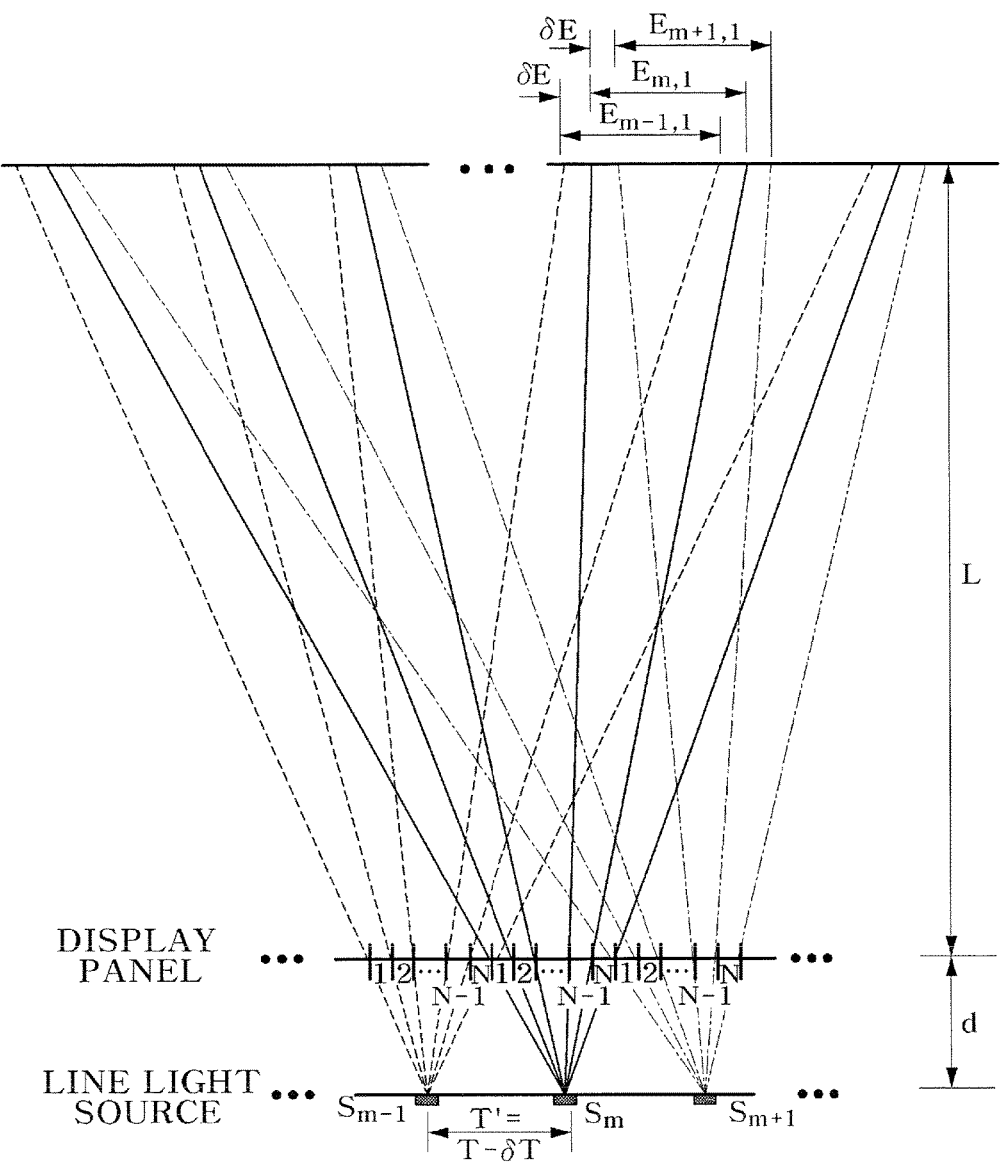
FIG. 8 is a conceptual diagram comparing and explaining a modified common viewing zone formation condition of a multi-view 3D image display apparatus according to a first embodiment of the present invention.

FIG. 5 is a conceptual diagram explaining common viewing zone formation conditions of a general multi-view 3D image display apparatus using an optical plate (parallax barrier or lenticular lens), FIG. 6 is a conceptual diagram explaining and comparing with FIG. 5 modified common viewing zone formation conditions of a multi-view 3D image display apparatus using an optical plate, FIG. 7 is a conceptual diagram explaining common viewing zone formation conditions of a general multi-view 3D image display apparatus using a line light source, and FIG. 8 is a conceptual diagram explaining and comparing with FIG. 7 modified common viewing zone formation conditions of a multi-view 3D image display apparatus using a line light source.

Referring to FIG. 5, common viewing zone formation conditions of a general multi-view 3D image display apparatus using an optical plate may be represented as the following Equations 1 and 2.

$$Wp: d = E: L \qquad \text{[Equations 1]}$$
$$d = \frac{L}{E} W_p$$

-continued $$N * W_p: (d + L) = T: L \quad \text{[Equations 2]}$$
$$T = N * W_p \frac{L}{d + L}$$

Here, Wp denotes a unit pixel width, d denotes a distance between a display panel and an optical plate (distance between parallax barrier and pixel on display panel when optical plate is parallax barrier and distance between optical center of lens and pixel on display panel when optical plate is lenticular lens), N denotes the number of viewpoints, E denotes a viewpoint interval, L denotes an optimum viewing distance (OVD), and T denotes a slit interval of the parallax barrier or a pitch of the lenticular lens.

By eliminating d from Equations 1 and 2, the following Equation 3 may be obtained.

$$T = N * W_p \frac{E}{W_p + E} \quad \text{[Equation 3]}$$

Subsequently, referring to FIG. 6, modified common viewing zone formation conditions of a multi-view 3D image display apparatus using an optical plate may be represented as the following Equations 4.

$$\delta E: (d + L) = \delta T: d \quad \text{[Equations 4]}$$
$$\delta E = \frac{d + L}{d} \delta T$$

By eliminating d from Equations 4 using Equations 1, the following Equations 5 may be obtained.

$$\delta E = \left(1 + \frac{E}{W_p}\right) \delta T \quad \text{[Equations 5]}$$
$$\delta T = \frac{W_p}{W_p + E} \delta E$$

Here, δT denotes a difference (that is, slit interval of optical plate or pitch difference of lenticular lens) of a period (T) of an optical plate for forming a common viewing zone in a general multi-view 3D image display apparatus and a period of an optical plate for forming a modified common viewing zone, and δE denotes a horizontal position difference between viewing zones for each viewpoint pixel which are created by a slit of an adjacent parallax barrier or the lenticular lens at a designed viewing position (L).

By combining Equations 3 and 5, the following Equations 6 that concern a slit interval of the parallax barrier or a pitch T' of the lenticular lens for the modified common viewing zone may be obtained.

$$T' = T + \delta T \quad \text{[Equations 6]}$$
$$T' = \frac{W_p}{W_p + E}(N \times E + \delta E)$$

That is, the slit interval of the parallax barrier or the pitch T' of the lenticular lens for the modified common viewing zone in the multi-view 3D image display apparatus using the optical plate should be larger than T of a general multi-view 3D image display apparatus, but should be smaller than T of the 3D image display apparatus employing the integral photography method.

Next, referring to FIG. 7, common viewing zone formation conditions of a general multi-view 3D image display apparatus using a line light source may be represented as the following Equations 7 and 8.

$$Wp: d = E: (L + d) \quad \text{[Equations 7]}$$
$$d = \frac{L}{E - W_p} W_p$$

$$N * W_p: L = T: (L + d) \quad \text{[Equations 8]}$$
$$T = N * W_p \frac{L + d}{L}$$

Here, Wp denotes a unit pixel width, d notes a distance between a display panel and a line light source, N denotes the number of viewpoints, E denotes a viewpoint interval, L denotes an OVD, and T denotes a pitch of the line light source.

By eliminating d from Equations 7 and 8, the following Equation 9 may be obtained.

$$T = N * W_p \frac{E}{E - W_p} \quad \text{[Equation 9]}$$

Subsequently, referring to FIG. 8, modified common viewing zone formation conditions of a multi-view 3D image display apparatus using a line light source may be represented as the following Equations 10.

$$\delta E: L = \delta T: d \quad \text{[Equations 10]}$$
$$\delta E = \frac{L}{d} \delta T$$

By eliminating d from Equations 10 using Equations 7, the following Equations 11 may be obtained.

$$\delta E = \left(\frac{E}{W_p} - 1\right) \delta T \quad \text{[Equations 11]}$$
$$\delta T = \frac{W_p}{E - W_p} \delta E$$

Here, δT denotes a difference between a period (T) of a line light source for forming a common viewing zone in a general multi-view 3D image display apparatus and a period of a line light source for forming a modified common viewing zone, and δE denotes a horizontal position difference of a viewing zone created by an adjacent line light source in a designed viewing position (L).

By combining Equations 9 and 11, the following Equations 12 that concern a pitch T' of a line light source for the modified common viewing zone may be obtained.

$$T' = T - \delta T \quad \text{[Equation 12]}$$

$$T' = \frac{W_p}{E - W_p}(N*E - \delta E)$$

That is, the pitch T' of the line light source for forming a modified common viewing zone in a multi-view 3D image display apparatus using a line light source should be smaller than T of a general multi-view 3D image display apparatus, but should be larger than T when a line light source is arranged with a period of the 3D image display apparatus employing the integral photography method.

Viewing zone characteristics of the multi-view 3D image display apparatus using the modified common viewing zone created by the above-described conditions may be different from common viewing zone characteristics of the general multi-view 3D image display apparatus. That is, in the common viewing zone characteristics of the general multi-view 3D image display apparatus, an amount of crosstalk is not uniform for each horizontal position as shown in FIG. 2. That is, the amount of crosstalk may be minimized at each center position of the common viewing zone, but a maximum amount of crosstalk may be obtained at boundaries between viewpoints. Thus, only when pupils of both eyes of a viewer are positioned in a center position of the viewing zone for each viewpoint pixel created by each corresponding viewpoint even though positioned within a central viewing zone range, optimum 3D images may be observed, and therefore a viewing position of the viewer may be limited.

However, in the viewing zone characteristics of the multi-view 3D image display apparatus using the modified common viewing zone, a magnitude difference of an amount of crosstalk according to a horizontal position of a viewer may be reduced from the concept of average compared to the common viewing zone characteristics at an OVD of the general multi-view 3D image display apparatus. Specifically, the degree of averaging may be represented using a ratio α of a size of a unit viewing zone ($E_m$ in FIGS. 6 and 8) in the multi-view 3D image display apparatus using the modified common viewing zone and a movement amount of a unit viewing zone ($E_{m-1}$ and $E_{m+1}$ in FIGS. 6 and 8) created by an adjacent parallax barrier, the lenticular lens, or the line light source as shown in the following Equation 13.

$$\alpha = \frac{E}{\delta E} \quad \text{[Equation 13]}$$

Here, an amount of crosstalk between adjacent viewpoints may be averaged along with an increase in α and a reduction in a movement amount (δE) in an adjacent unit viewing zone. Thus, the magnitude difference of the average amount of crosstalk according to a horizontal position of a viewer may be reduced.

In addition, as characteristics of the modified common viewing zone, a change width (ΔCrosstalk) of an amount of crosstalk within a central viewing zone range according to a change in α may be defined by the following Equation 14.

$$\Delta\text{Crosstalk} = \text{Crosstalk(max)} - \text{Crosstalk(min)} \quad \text{[Equation 14]}$$

Here, crosstalk(max) denotes a maximum amount of crosstalk according to a horizontal position within a modified common viewing zone range, and crosstalk(min) denotes a minimum amount of crosstalk according to the horizontal position within the modified common viewing zone range.

In Equation 14, an amount of crosstalk between adjacent viewpoints may be averaged along with an increase in a indicating the degree to which the modified common viewing zone is averaged, and therefore a change width (Δ Crosstalk) of the amount of crosstalk according to the horizontal position may be minimized.

Figure 9A:
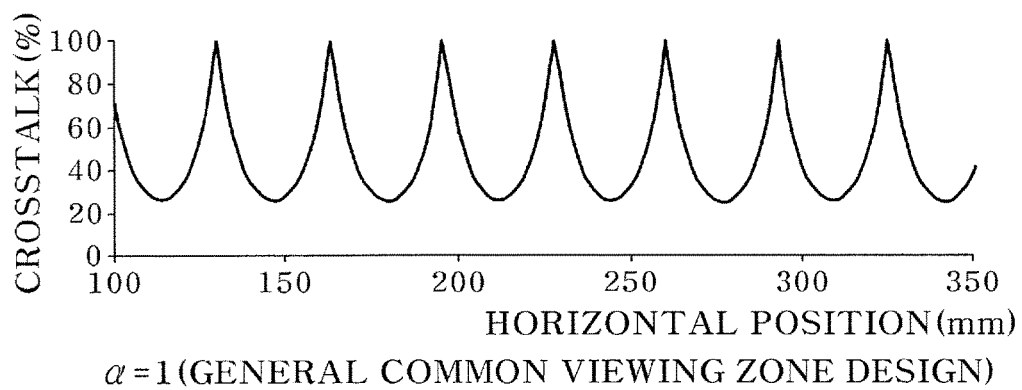
FIGS. 9A to 9F are simulation graphs showing an amount of crosstalk according to $\alpha$ in a multi-view 3D image display apparatus using a modified common viewing zone according to a first embodiment of the present invention.
Figure 9B:
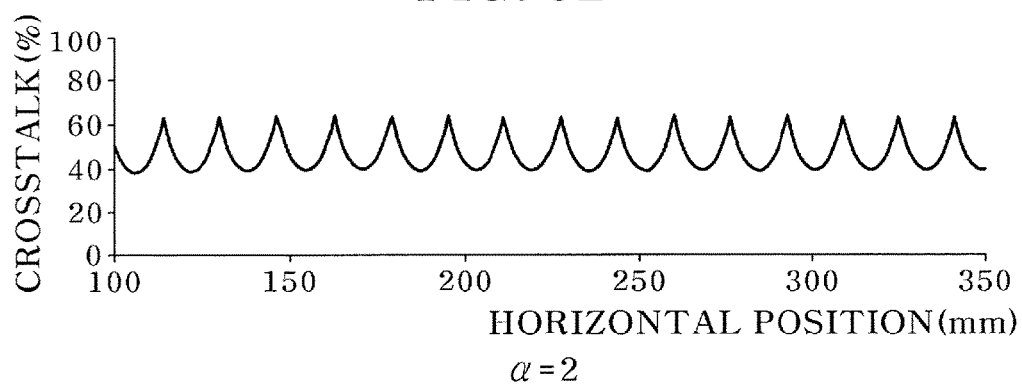
Figure 9C:
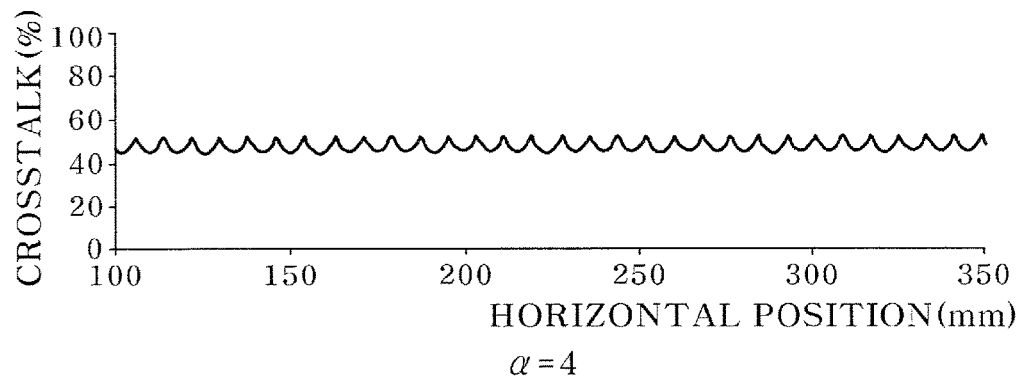
Figure 9D:
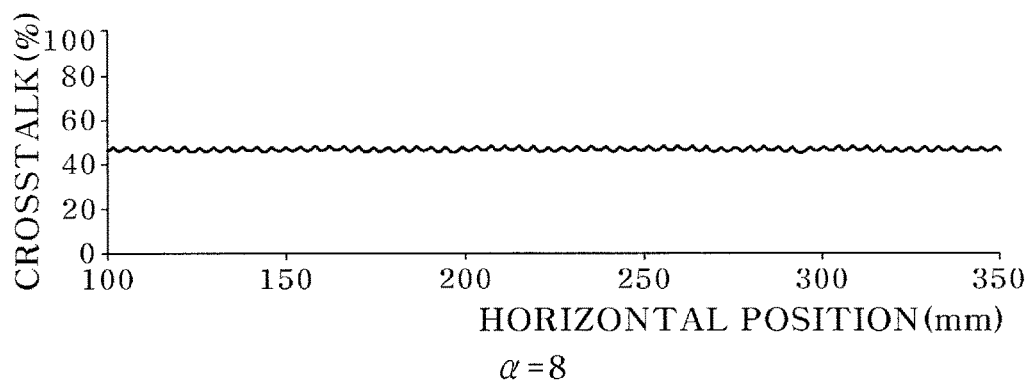
Figure 9E:
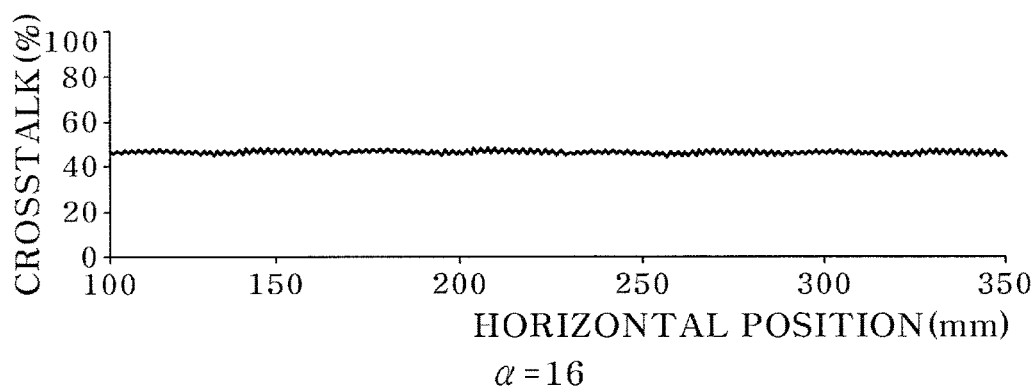
Figure 9F:
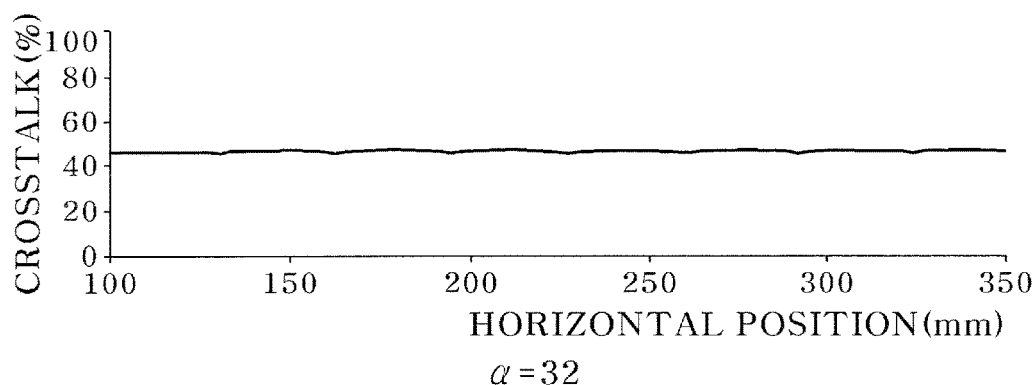

FIGS. 9A to 9F are graphs showing averaging characteristics of crosstalk according to α of the modified common viewing zone according to the first embodiment of the present invention, and are simulation results with respect to changes in the amount of crosstalk according to a horizontal position of a viewer of the multi-view 3D image display apparatus that is designed with four viewpoints using a parallax barrier in which an interval (E) between viewpoints is 32.5 mm. FIG. 9A corresponds to a case in which α=1 is satisfied and shows changes in the amount of crosstalk according to a horizontal position in a case that is the same as the multi-view common viewing zone design (that is, common viewing zone formation condition). In this case, the amount of crosstalk is a maximum at a boundary between adjacent viewing zones and a minimum at a center portion of the viewing zone, and therefore Δ Crosstalk is 74%. Such a Δ Crosstalk is reduced along with an increase in α, and when α=8 as shown in FIG. 9D, the amount of crosstalk is averaged (Δ Crosstalk being 3% or less) according to the viewer position within a central viewing zone, so that change in image quality of 3D images hardly exists.

Figure 10:
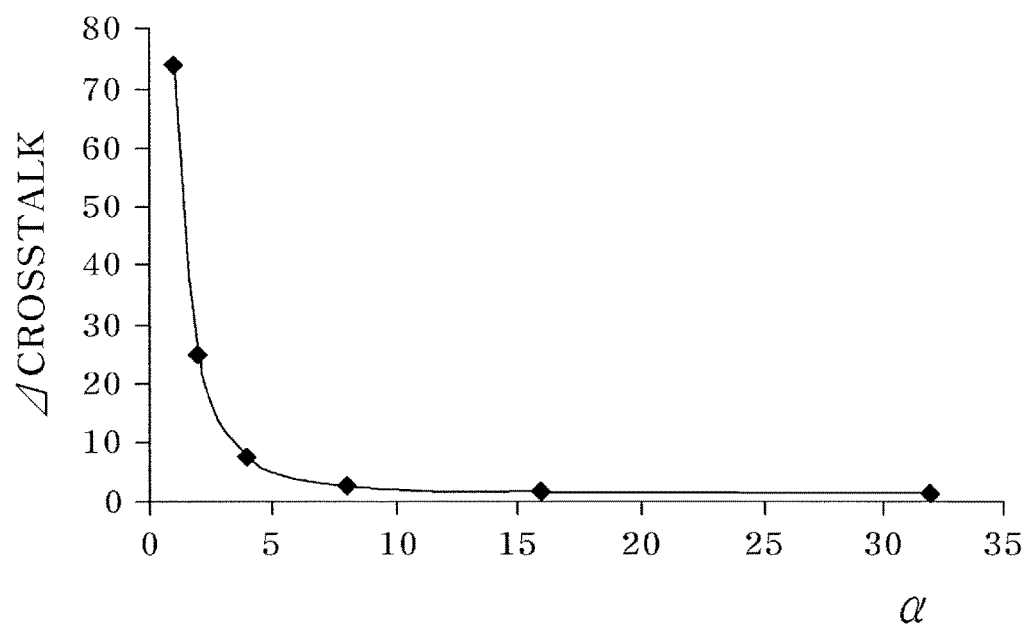
FIG. 10 is a simulation graph showing a change width ($\Delta$ Crosstalk) of an amount of crosstalk within a viewing zone according to $\alpha$ of a modified common viewing zone of a multi-view 3D image display apparatus using a parallax barrier.

FIG. 10 is a graph showing a change in Δ Crosstalk according to a under design conditions of FIG. 9. Referring to FIG. 10, even when α is 8 or larger, an average amount of crosstalk reaches 46.7% under the above-described design conditions, so that it can be seen that the average amount of crosstalk itself is large. That is, even though uniform 3D images are provided at the time of horizontal movement of a viewer, there is a disadvantage of the average amount of crosstalk being large. For reference, an amount of crosstalk of a general glasses type 3D display is 5% or less.

Accordingly, in the 3D image display apparatus using such a modified common viewing zone, the viewing zone for each viewpoint pixel that forms the modified common viewing zone is formed in a rectangle-like shape or a trapezoid-like shape in order to reduce the average amount of crosstalk, and therefore an absolute amount of crosstalk between adjacent unit viewpoints may be reduced. Hereinafter, with reference to FIGS. 11 to 16, a method of reducing the average amount of crosstalk of the 3D image display apparatus using the modified common viewing zone according to the first embodiment of the present invention will be described.

Figure 11A:
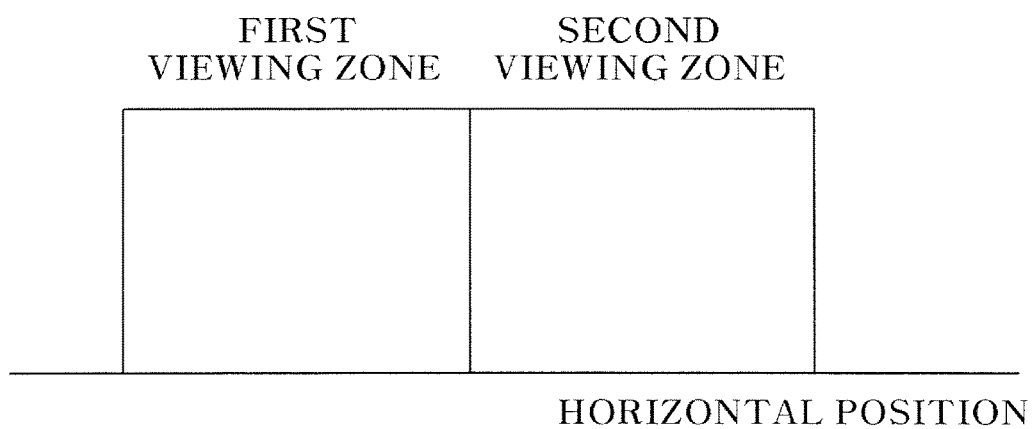
FIG. 11A is a graph explaining brightness distribution of an ideal viewing zone for reducing an average amount of crosstalk.

Brightness distribution of an ideal viewing zone for reducing the average amount of crosstalk is shown in FIG. 11A. In the rectangular viewing zone shown in FIG. 11A, brightness distribution of the viewing zone is uniform according to a horizontal position of a viewer, and therefore a viewer may view 3D images with uniform brightness without any change in brightness in each viewpoint image even when pupils of both eyes of the viewer are respectively positioned in a first viewing zone and a second viewing zone and horizontally move within the respective viewing zones. That is, in such an ideal case, the amount of crosstalk becomes 0 even when pupils of the viewer move within the first and second viewing zone ranges. However, brightness distribution of the viewing zone for each viewpoint pixel that can be actually implemented may be formed as a trapezoidal distribution in which boundary portions of each unit viewing zone are inclined and partially overlap, as shown in FIG. 11B.

Figure 12:
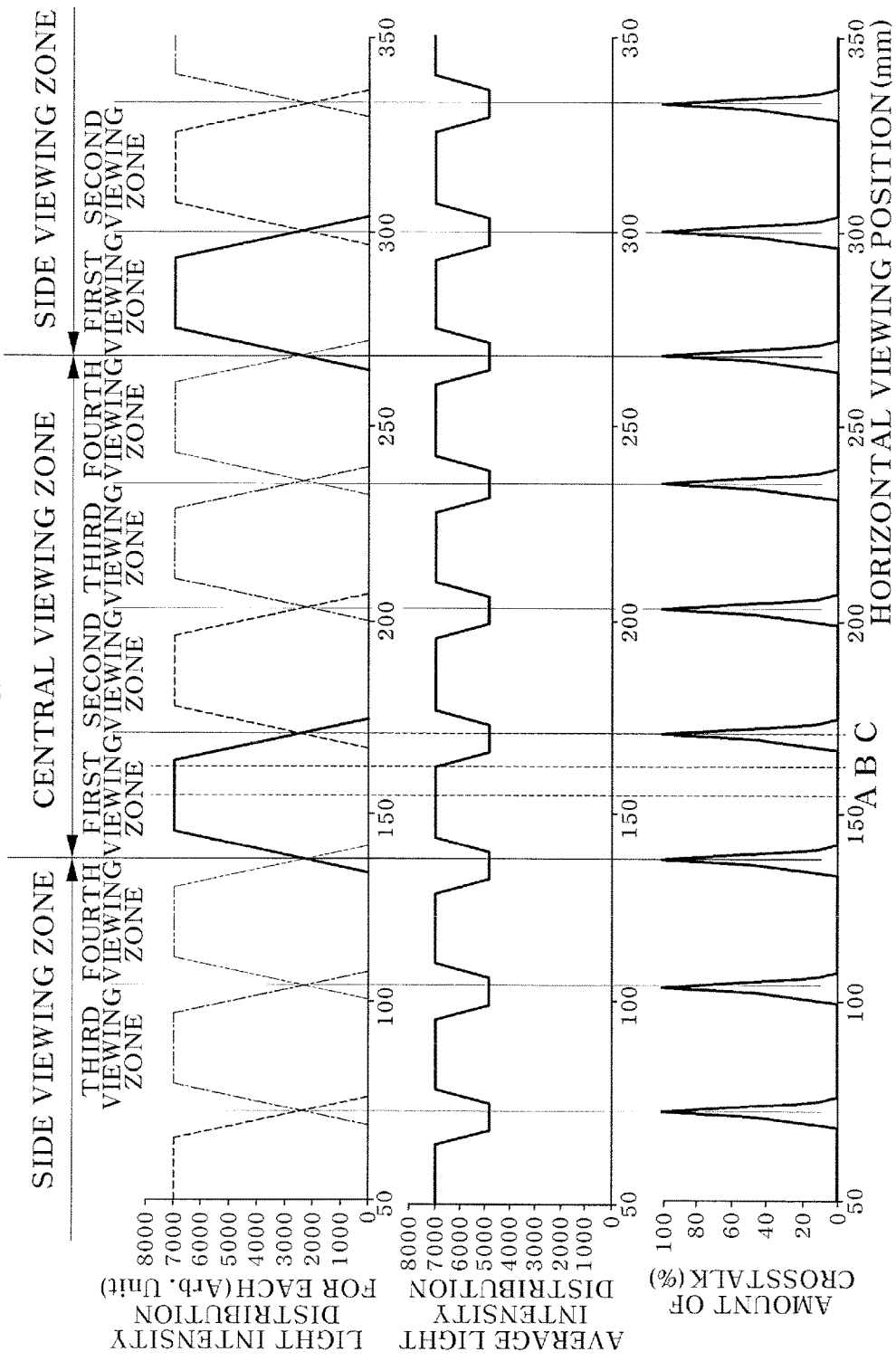
FIG. 12 is a graph showing average light intensity distribution and distribution of an amount of crosstalk according to a horizontal viewing position when forming a viewing zone for each trapezoidal viewpoint pixel of FIG. 11B.
Figure 13A:
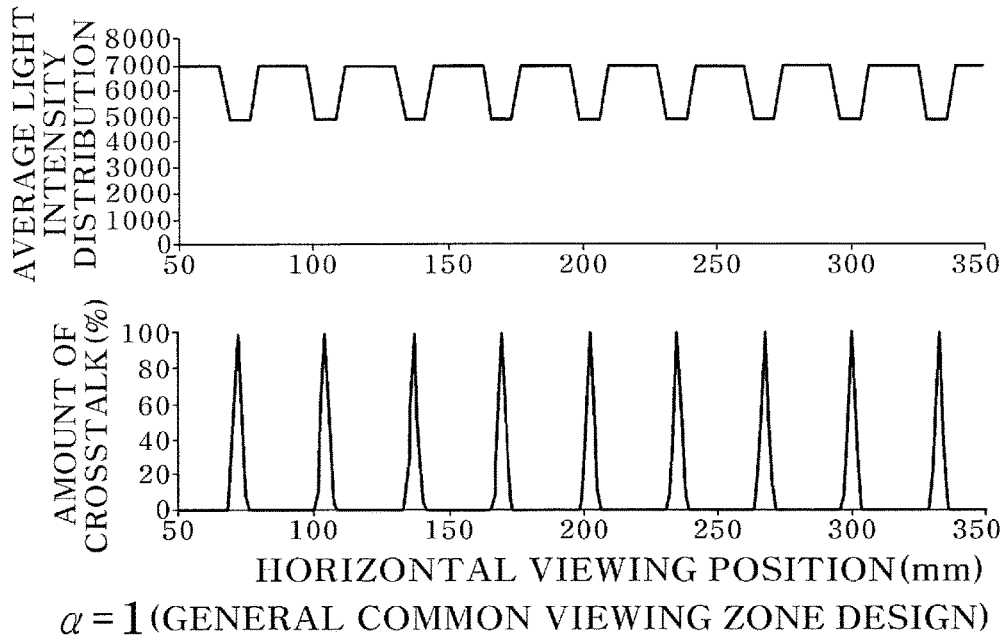
FIGS. 13A to 13F are graphs explaining an averaging effect according to a in a multi-view 3D image display apparatus using a modified common viewing zone that uses a viewing zone for each trapezoidal viewpoint pixel of FIG. 12.
Figure 13B:
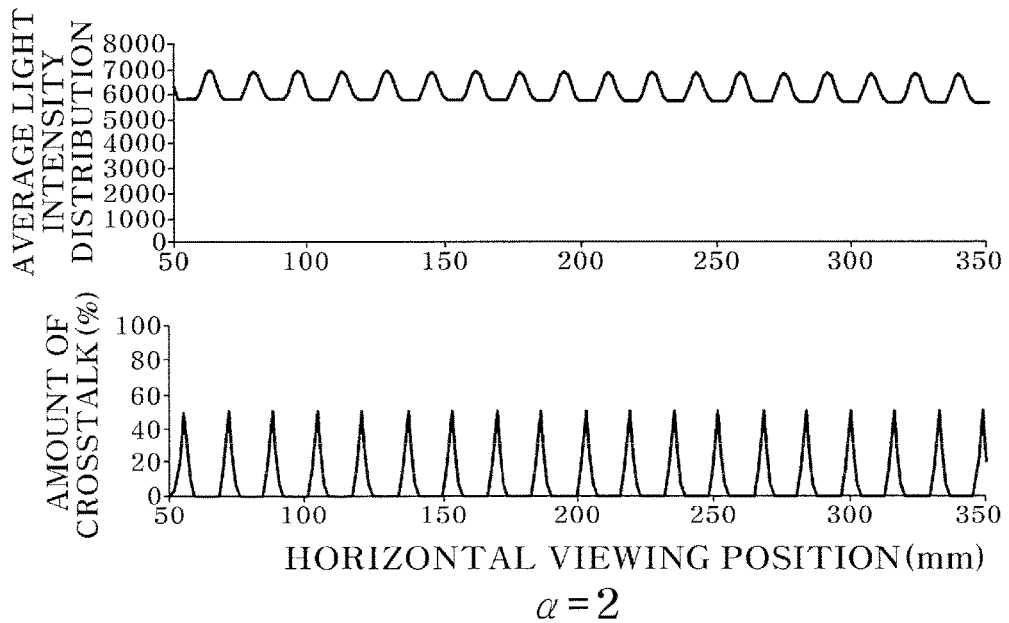
Figure 13C:
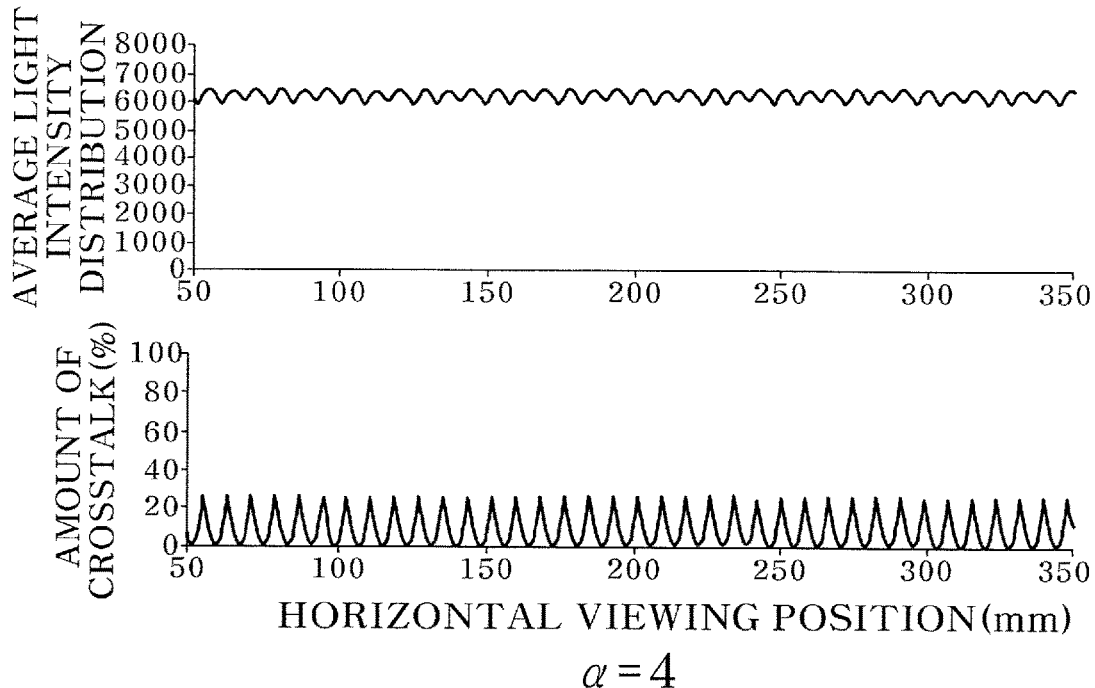
Figure 13D:
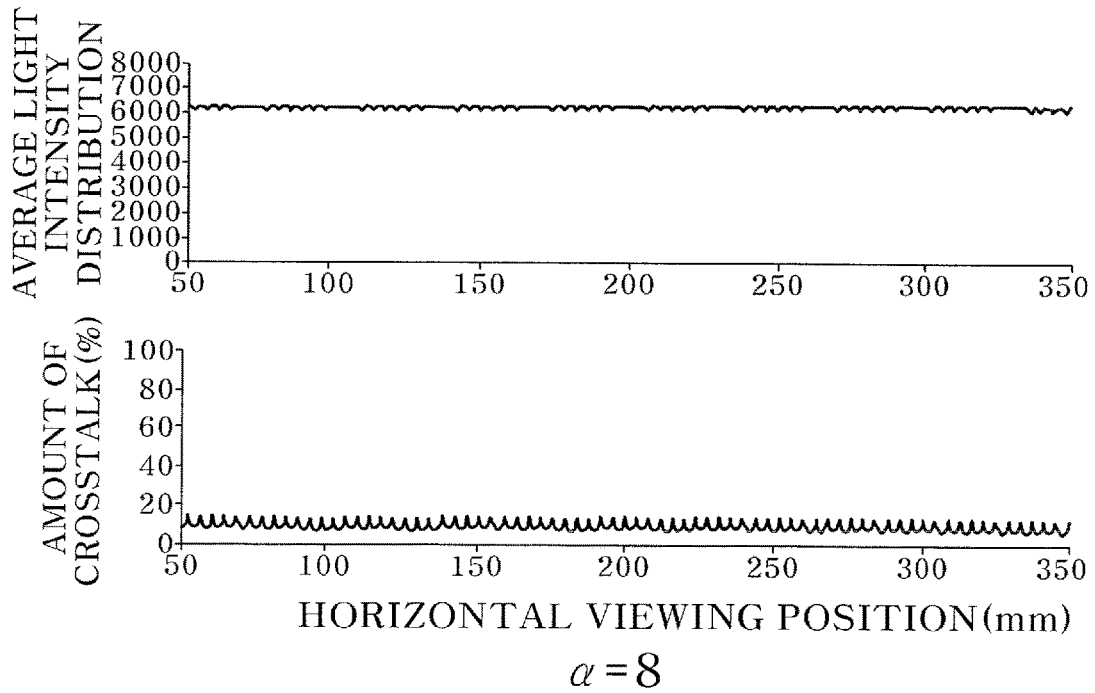
Figure 13E:
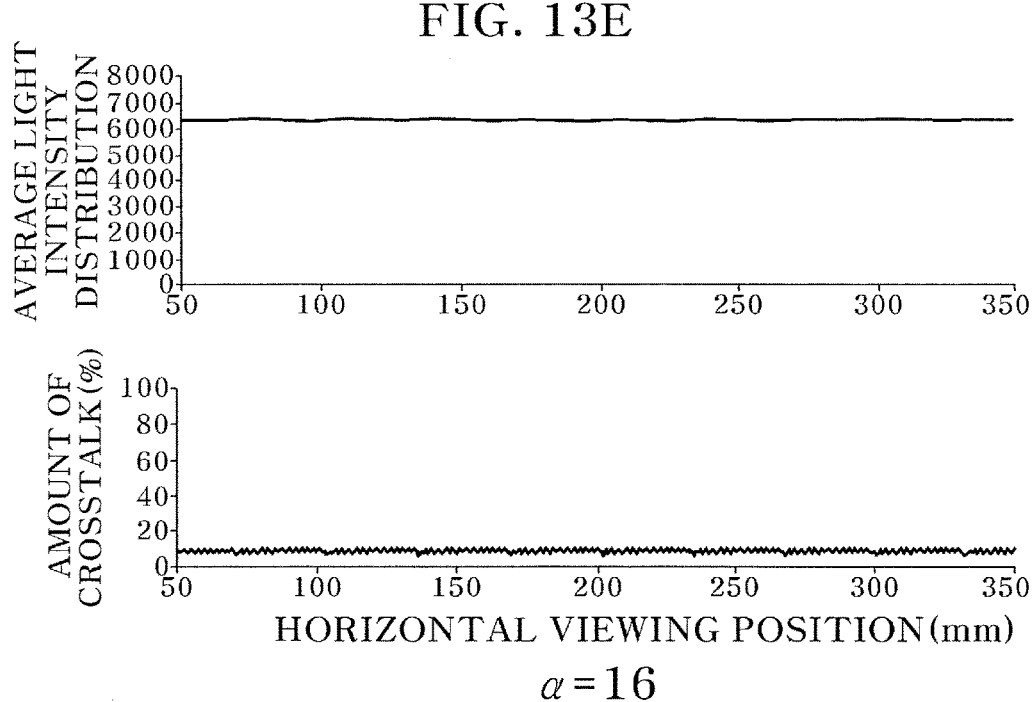
Figure 13F:
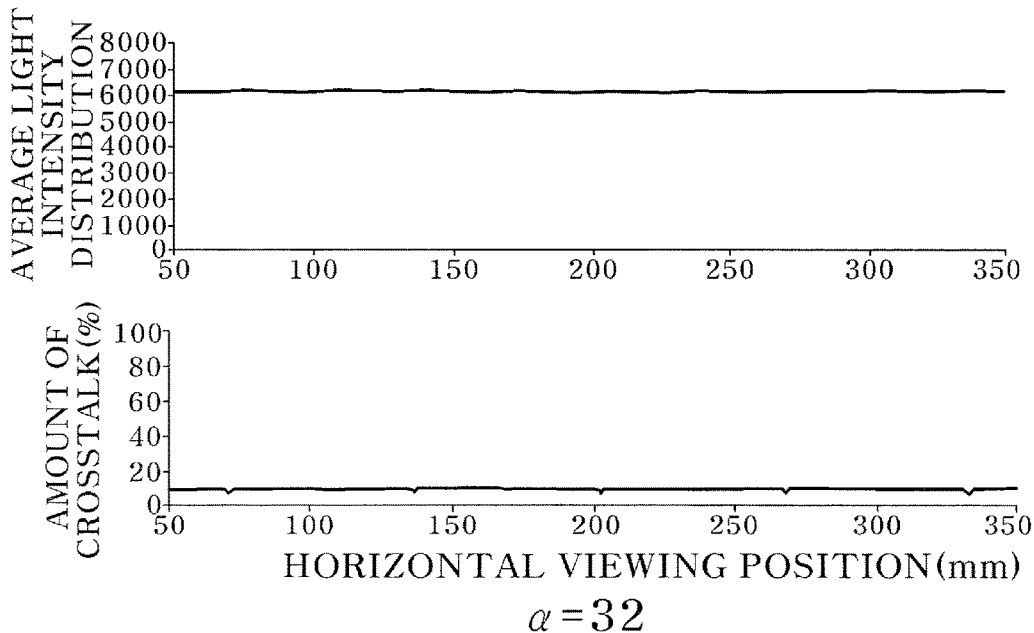

FIG. 12 shows one example with respect to light intensity distribution, average light intensity distribution, and an amount of crosstalk according to a horizontal position at a viewer position of the multi-view 3D image display apparatus which is designed with four viewpoints that form a trapezoidal viewing zone for each viewpoint pixel. When creating the trapezoidal viewing zone for each viewpoint pixel, the amount of crosstalk may be 0 even in a case in which pupils of both eyes of a viewer are positioned at a position B that deviates from a center portion A of the viewing zone as well as a case in which the pupil is positioned in the center portion A. However, when the pupil is positioned at a boundary portion C of the viewing zone, the viewer may experience a maximum amount of crosstalk of 100%. In addition, in the present example, there is a problem that average light intensity distribution associated with brightness of an image also changes according to the horizontal position of the viewer. A difference Δ Crosstalk in the amount of crosstalk and a difference in the average light intensity distribution according to the horizontal position may be minimized along with an increase in a, which is a ratio of a movement amount (δE) of an adjacent viewing zone and a size (E) of a unit viewing zone as described with reference to FIGS. 9 and 10.

FIGS. 13A to 13F show average light intensity distribution and an amount of crosstalk according to a horizontal position at a viewer position when increasing α of the trapezoidal viewing zone for each viewpoint pixel starting from a case of α=1 (that is, common viewing zone formation condition) to a case of α=32. Here, the average amount of crosstalk has a relatively low value of about 10%. This is because performance improvement is exhibited due to a small average amount of crosstalk compared to the general multi-view 3D image display apparatus. However, even in this case, when α is small, particularly, when α is 4, a difference between a maximum amount of crosstalk and a minimum amount of crosstalk has a relatively large value of 20% or more. Consequently, when α is 8 or larger, a difference Δ Crosstalk between the average light intensity distribution and the amount of crosstalk may be reduced to 3% or less, and therefore a viewer may experience uniform brightness and a low amount of crosstalk even though the viewer moves horizontally.

Figure 11B:
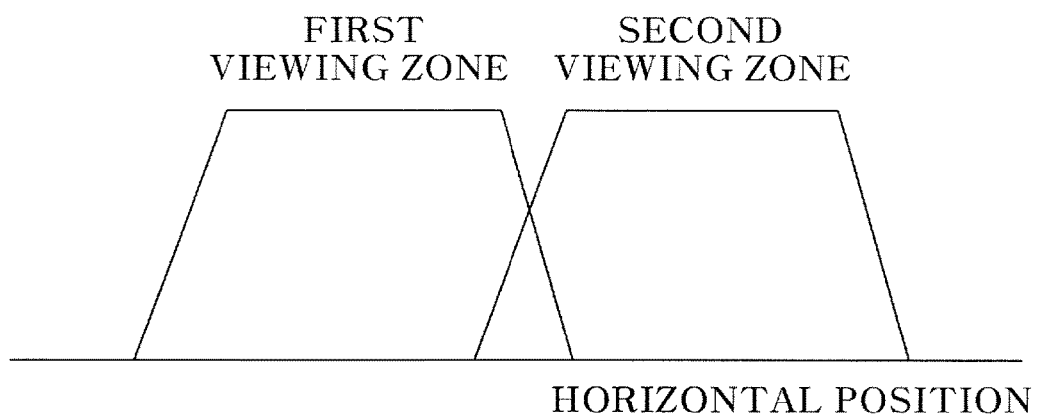
FIG. 11B is a graph explaining brightness distribution of a viewing zone that can be actually implemented for reducing an average amount of crosstalk.

As a method of creating the viewing zone for each viewpoint pixel that forms the modified common viewing zone according to the first embodiment of the present invention as the trapezoidal viewing zone for each viewpoint pixel as shown in FIGS. 11B and 12, a method of reducing a size of an opening of a parallax barrier or a line width of a line light source to a predetermined value or smaller compared to a unit pixel width may be used.

As an example, in the 3D image display apparatus that forms the modified common viewing zone using the line light source, an average amount of crosstalk may be reduced by reducing a line width of the line light source to a predetermined value or smaller compared to the pixel width.

Figure 14:
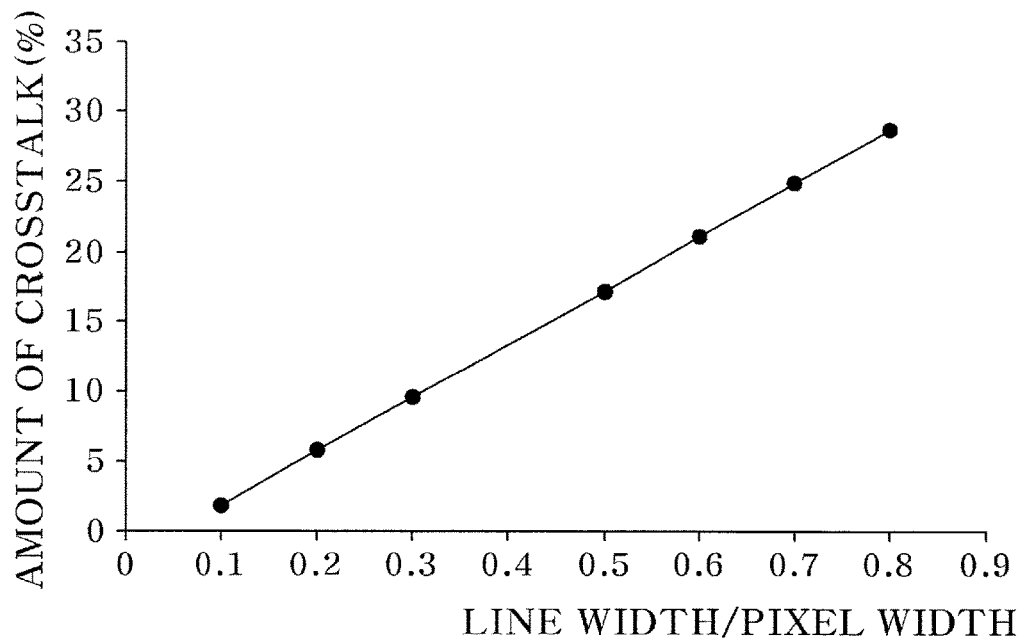
FIG. 14 is a graph showing an average amount (%) of crosstalk within a unit viewing zone according to a pixel width compared to a line width of a vertical line light source.

FIG. 14 is a graph showing an average amount (%) of crosstalk within a unit viewing zone according to a change in a pixel width compared to a line width of a vertical line light source. The average amount of crosstalk of the modified common viewing zone according to an embodiment of the present invention may increase with increase in the pixel width compared to the line width of the line light source. The amount of crosstalk of 10% or less that approximates the level of the glasses type 3D image display apparatus can only be realized when the pixel width compared to the line width of the line light source is 0.3 or less. Thus, in order to reduce the average amount of crosstalk, it is desirable that the line width of each line light source be 30% or less (not including 0) compared to the pixel width.

Figure 15:
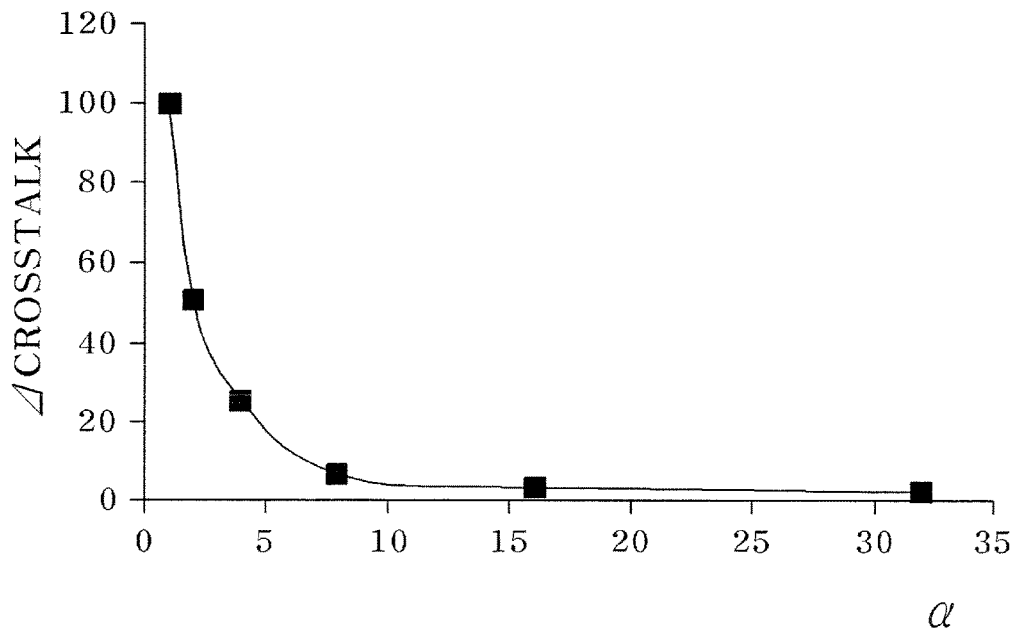
FIG. 15 is a simulation graph showing a change width (Δ Crosstalk) of an amount of crosstalk within a viewing zone according to α of a modified common viewing zone of a multi-view 3D image display apparatus using a line light source when a pixel width compared to a line width of the line light source is 0.3.

FIG. 15 shows characteristics of a difference Δ Crosstalk in an amount of crosstalk within a modified common viewing zone range at a viewing position, according to α indicating averaging characteristics of the modified common viewing zone when a pixel width compared to a line width of a line light source is 0.3. In a similar manner to FIG. 10, which shows characteristics of a case of using a parallax barrier, Δ Crosstalk significantly decreases as α increases. Specifically, Δ Crosstalk is 7% when α is 8, and 3% when α is 16. Thus, in order to sufficiently provide an averaging effect of the magnitude of crosstalk to a viewer, α is desirably 8 or larger, and more desirably 16 or larger, in which case Δ Crosstalk is 3% or less and a viewer may hardly experience any change in crosstalk during horizontal movement.

Figure 16:
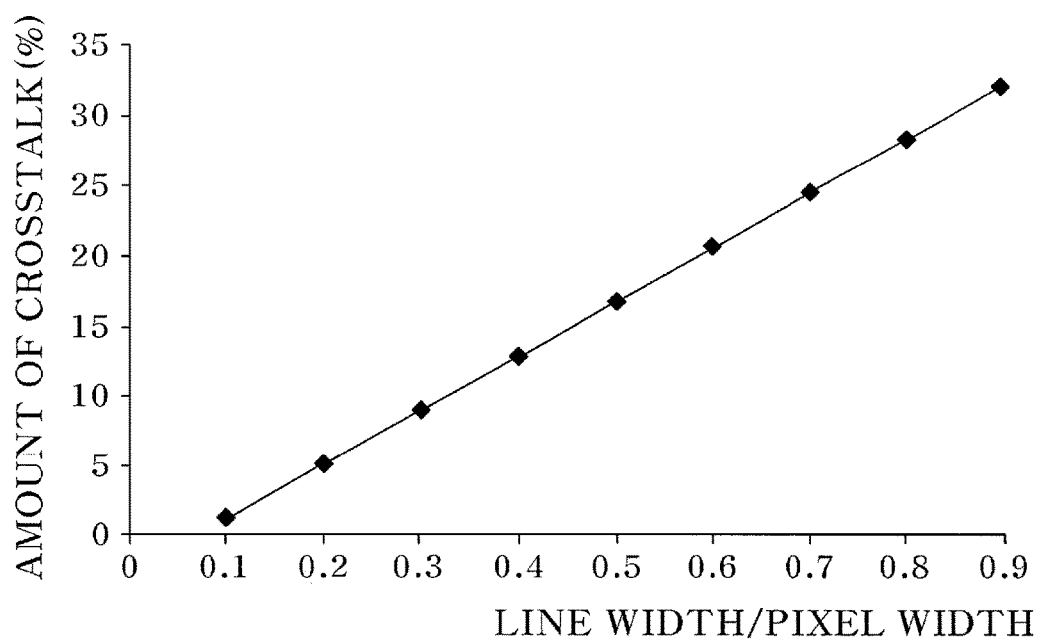
FIG. 16 is a graph showing an average amount (%) of crosstalk within a unit viewing zone according to a pixel width compared to a size of an opening of a vertical parallax barrier.

As another example, in the 3D image display apparatus that forms the modified common viewing zone using a parallax barrier, the average amount of crosstalk may be reduced by reducing a size of an opening of the parallax barrier. FIG. 16 is a graph showing an average amount (%) of crosstalk within a unit viewing zone according to a change in a pixel width compared to a width of an opening of a vertical parallax barrier that is designed with four viewpoints. Referring to FIG. 16, by reducing the width of the opening of the parallax barrier to 30% or less of the pixel width, an average amount of crosstalk of 10% or less can be achieved.

(Second Embodiment)

Figure 17:
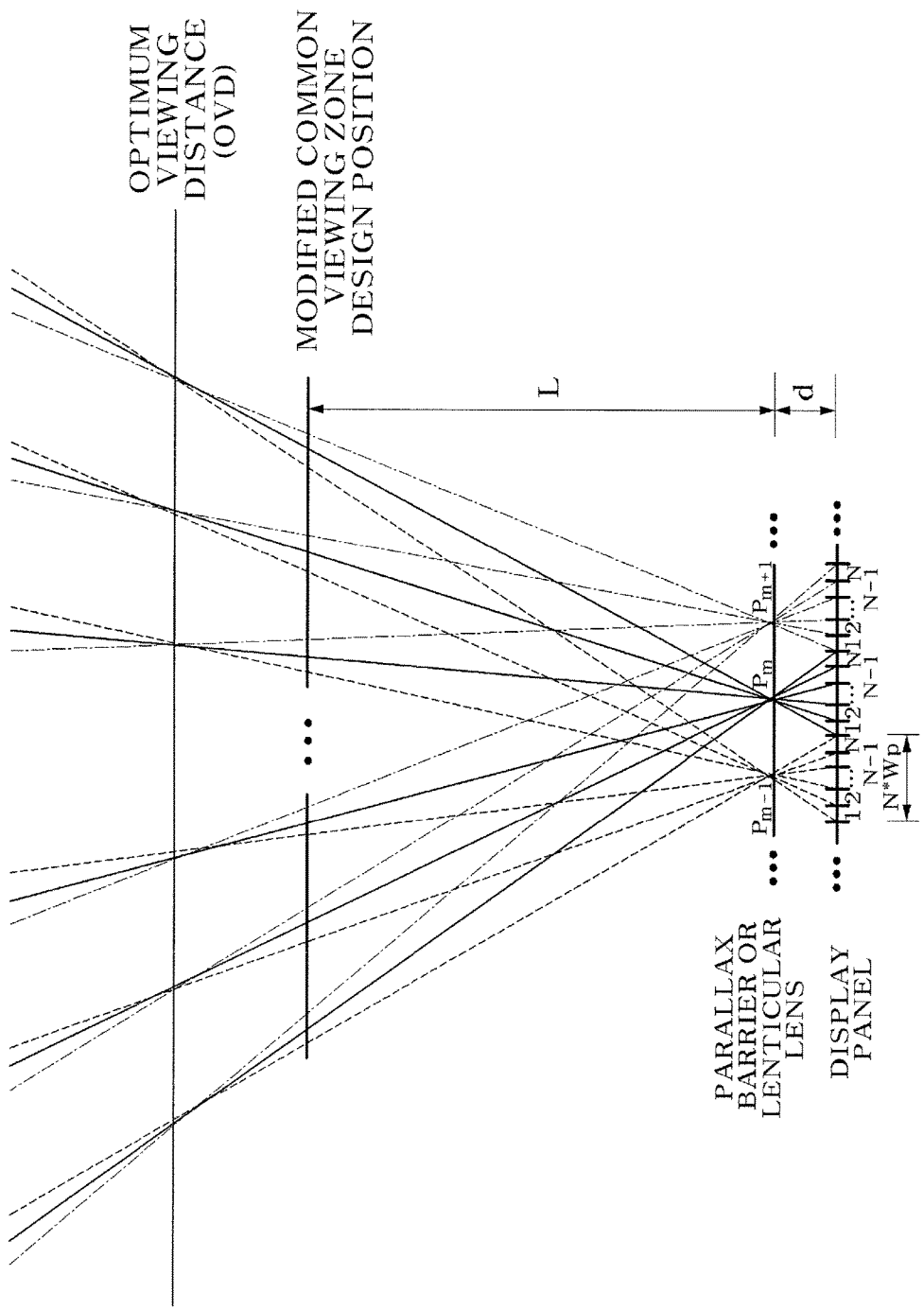
FIG. 17 is a conceptual diagram explaining a design method of a modified common viewing zone created at an optimum viewing distance (OVD)

Hereinafter, concept of a modified common viewing zone according to a second embodiment of the present invention will be described with reference to FIGS. 17 to 19.

In the method of using the modified common viewing zone which has been described with reference to FIGS. 4, 6, and 8, a modified viewing zone having a central viewing zone range between methods of creating the common viewing zone of the multi-view 3D image display apparatus and a parallel viewing zone of the integral photography method may be used. This has the same meaning as using a previous area of an OVD in the general multi-view 3D design as shown in FIG. 17. However, in this case, a depth direction distance is limited and the modified common viewing zone range should be smaller than the central viewing zone range in the OVD.

In the second embodiment of the present invention using the modified common viewing zone that can overcome such limitations, an area of the modified common viewing zone beyond the OVD where the common viewing zone of the multi-view 3D image display apparatus is created may be used. In this instance, the area of the modified common viewing zone may refer to an area in which a viewer dose not experience inverse stereoscopic vision even in the viewing zone by any pixel and averaged crosstalk between viewpoint images is provided.

Figure 18:
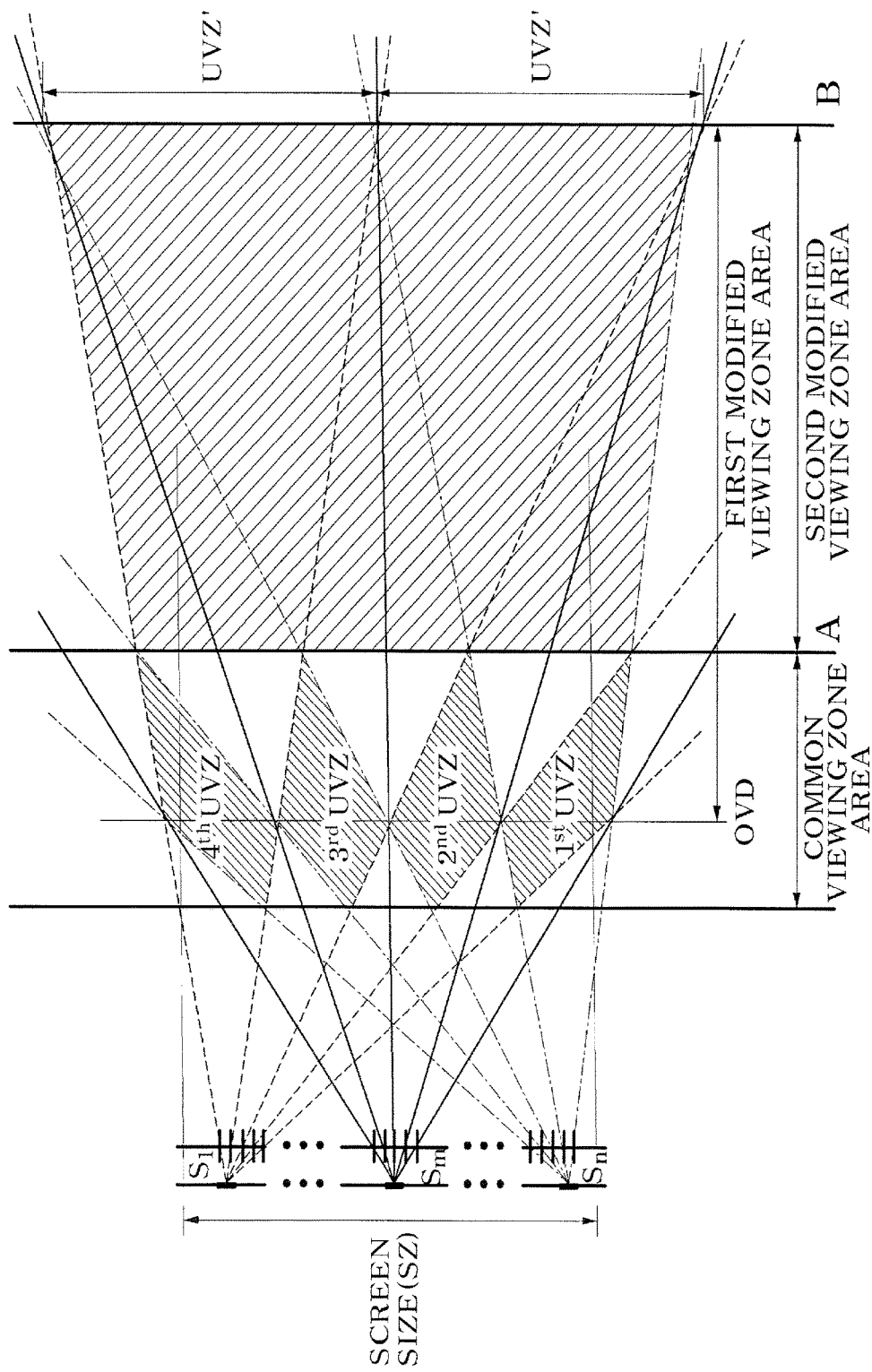
FIGS. 18 and 19 are conceptual diagrams explaining a design method of a modified common viewing zone according to a second embodiment of the present invention which is created beyond an OVD in cases of using a line light source and a parallax barrier, respectively.
Figure 19:
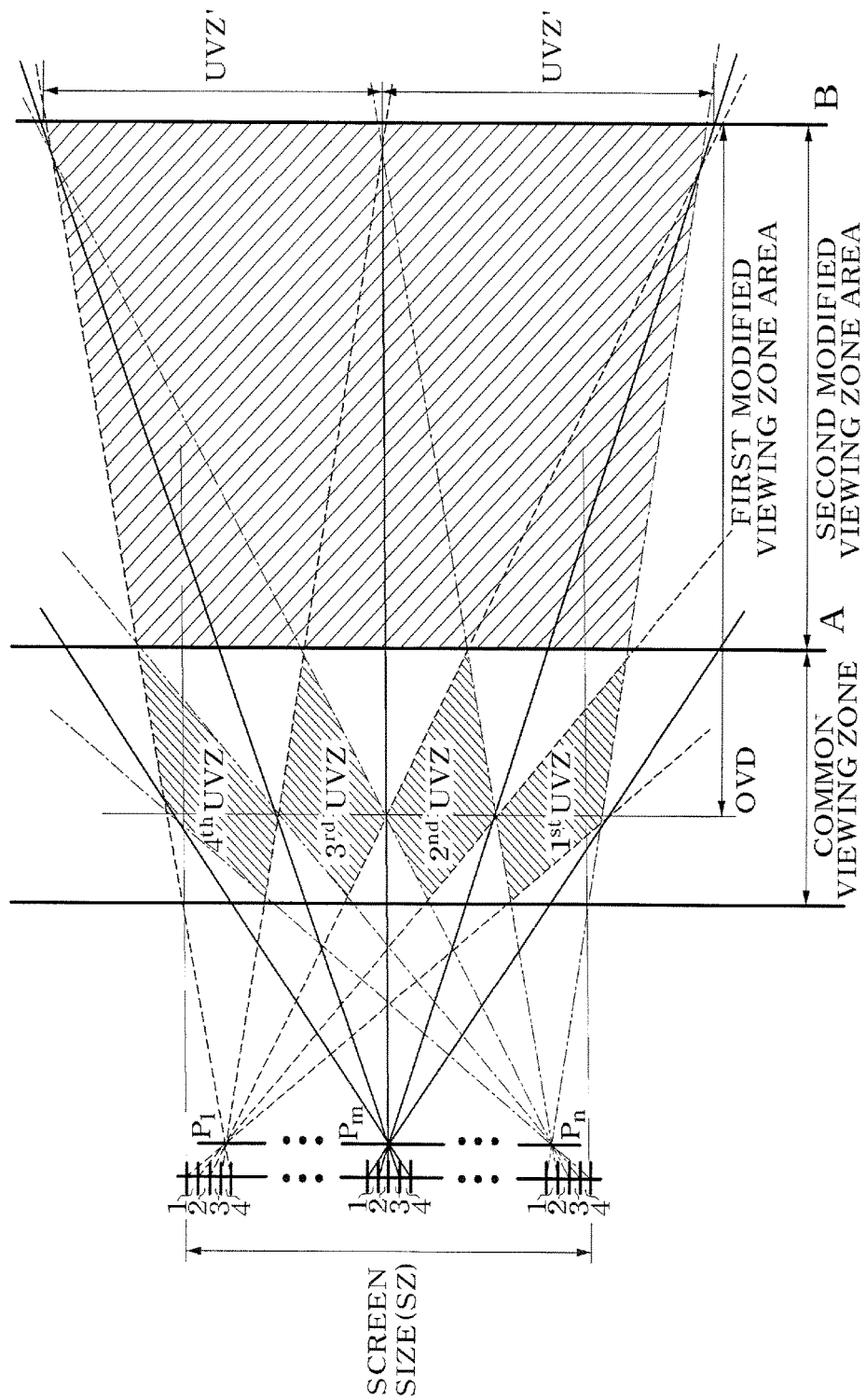

FIGS. 18 and 19 are conceptual diagrams showing a modified common viewing zone area beyond a common viewing zone area of the multi-view 3D image display apparatus that is designed with four viewpoints in cases of using a line light source and a parallax barrier, respectively. A depth direction range of the modified common viewing zone defied in the second embodiment of the present invention may roughly refer to a range (first modified viewing zone area) up to a position (position B in FIGS. 18 and 19) at which a size of each unit viewing zone (unit viewing zone in this instance refers to a distance between neighboring viewpoints of viewpoint images formed at a viewing position from a set of pixels providing viewpoint images together with an opening of a single parallax barrier in FIG. 18, and refers to a distance between neighboring viewpoints of viewpoint images formed at the viewing position from a set of pixels providing the viewpoint images together with a single line light source in FIG. 19) in a depth direction beyond the OVD is the same as an average binocular distance (65 mm) of a viewer, and may narrowly refer to a range (second modified viewing zone area) up to a position (position B in FIGS. 18 and 19) at which a size of each unit viewing zone in a depth direction is the same as the average binocular distance (65 mm) of the viewer, from a most distant position (position A in FIGS. 18 and 19) of the common viewing zone beyond the OVD. A horizontal range of the modified common viewing zone defined in the second embodiment of the present invention may refer to a central viewing zone range (or range in which there is no inverse stereoscopic vision) in the above-described corresponding depth direction position in the multi-view 3D image display apparatus that forms the common viewing zone. Therefore, the area of the modified common viewing zone may refer to a range in which a depth direction range and a horizontal range of the modified common viewing zone are simultaneously satisfied.

In order to efficiently use such a modified common viewing zone beyond the OVD according to the second embodiment of the present invention, a size of the central viewing zone (size of the central viewing zone in this instance refers to a value obtained by multiplying a size of a unit viewing zone in the OVD and the number of viewpoints) of the common viewing zone in the OVD should be the same as or larger than a horizontal size of the display panel. Under such a limiting condition, as shown in FIGS. 18 and 19, a range of the modified viewing zone area in the depth direction includes a range much wider than a depth direction range of the common viewing zone of the general multi-view 3D image display apparatus, and therefore the degree of freedom of a position of a viewer at which clear 3D images can be viewed can be increased.

A starting position in the depth direction of the modified viewing zone area, based on its rough meaning, corresponds to an OVD of the common viewing zone. However, in this case, the common viewing zone covers part of an area up to a predetermined distance from the OVD in the depth direction (see, diamond-shaped unit viewing zone area (UVZ) in FIGS. 18 and 19). The concept of average crosstalk in the present invention is not applied to the unit viewing zone in which a common viewing zone near such an OVD is formed, and therefore the starting position in the depth direction of the modified viewing zone area is desirably set as an end position (position A in FIGS. 18 and 19) of the common viewing zone area. In addition, an end position of the modified common viewing zone in the depth direction is a position (position B in FIGS. 18 and 19) at which a size of each unit viewing zone in the common viewing zone position is increased to be the same as an interval (65 mm) between pupils of eyes of a viewer. This is because, when viewpoint images from each pixel of the display panel are viewed simultaneously by both eyes of the viewer, even though the modified common viewing zone area is used, the viewer cannot properly view separated parallax images.

Hereinafter, a method of setting a maximum range in the depth direction of the modified common viewing zone defined according to the second embodiment of the present invention in cases of using a line light source and a parallax barrier will be described with reference to FIGS. 20 to 23.

Figure 20:
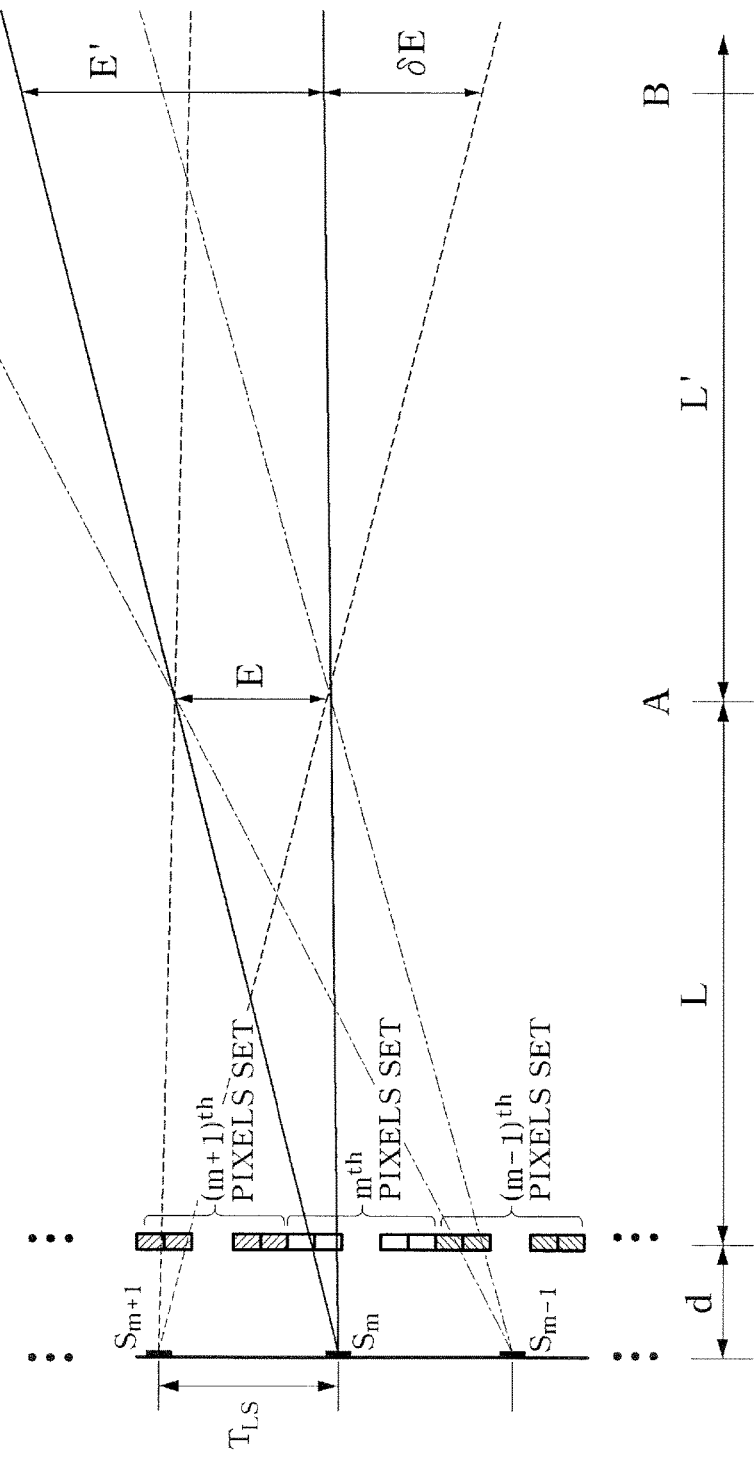
FIGS. 20 and 21 are a conceptual diagram for setting a range in a depth direction of a modified common viewing zone according to a second embodiment of the present invention which is created beyond an OVD using a line light source, and a graph showing α and E' during movement in a depth direction from the OVD.

FIG. 20 is a conceptual diagram for deriving a range of the modified common viewing zone area in a case of using a line light source designed with N viewpoints. For convenience, only some pixels of the display panel and some line light sources corresponding to these pixels are shown. The respective line light sources are arranged so as to be separated by a predetermined interval ($T_{LS}$) in a horizontal direction, and pixels of the display panel are arranged so as to be spaced apart from each other by a predetermined distance (d) in a viewer direction from the line light source. In this instance, viewpoint images are arranged in each pixel by a control unit of an image display apparatus, and each viewpoint image is collected within a fixed predetermined area at a formation position (A) of the common viewing zone in the depth direction and then spread out. In this case, conditions of Equations 7 and 9 which are basic design conditions of the line light source may be equally applied. However, a size (E) of a modified unit viewing zone of an arbitrary specific position (B position) in a modified viewing zone range (L') in the depth direction, a viewing zone formation horizontal position difference ($\delta E$) with an adjacent modified unit viewing zone, and a ratio $\alpha$ (=E'/$\delta E$) of a viewing zone formation horizontal position difference between the modified unit viewing zone and an adjacent modified unit viewing zone are represented as the following Equations 15 to 17.

$$T_{LS}: (d + L) = \delta E: L' \qquad \text{[Equations 15]}$$
$$\delta E = \frac{L' * T_{LS}}{d + L}$$

$$E: (d + L) = E': (d + L + L') \qquad \text{[Equation 16]}$$
$$E' = \frac{d + L + L'}{d + L} * E$$

$$\alpha = \frac{E'}{\delta E} \qquad \text{[Equation 17]}$$
$$= \frac{d + L + L'}{L' * T_{LS}} * E$$

A specific example with respect to a depth direction range of the modified common viewing zone satisfying the above relations of the line light source will be described with reference to FIG. 21. It is assumed that the image display apparatus used in the design is a 30-inch display panel having 2560×1600 resolution, a pixel size thereof is 0.0835 mm, and pixels are black and white pixels which are not separated into RGB components. A horizontal size of the display panel is 641.28 mm. As 3D design conditions, the number of viewpoints (N) is 20, an OVD (L) is 700 mm, a size (E) of a unit viewpoint in the OVD is 33 mm, a period (TLS) of a line light source is 1.674 mm, and a distance (d) between the line light source and the display panel is 1.776 mm. Under such conditions, a horizontal range (N*UVZ) of a central viewing zone in the OVD is 660 mm, which is larger than a horizontal size of the display panel. As a result, a horizontal range within the modified common viewing zone range is larger than a horizontal range of the central viewing zone in the OVD.

Figure 21:
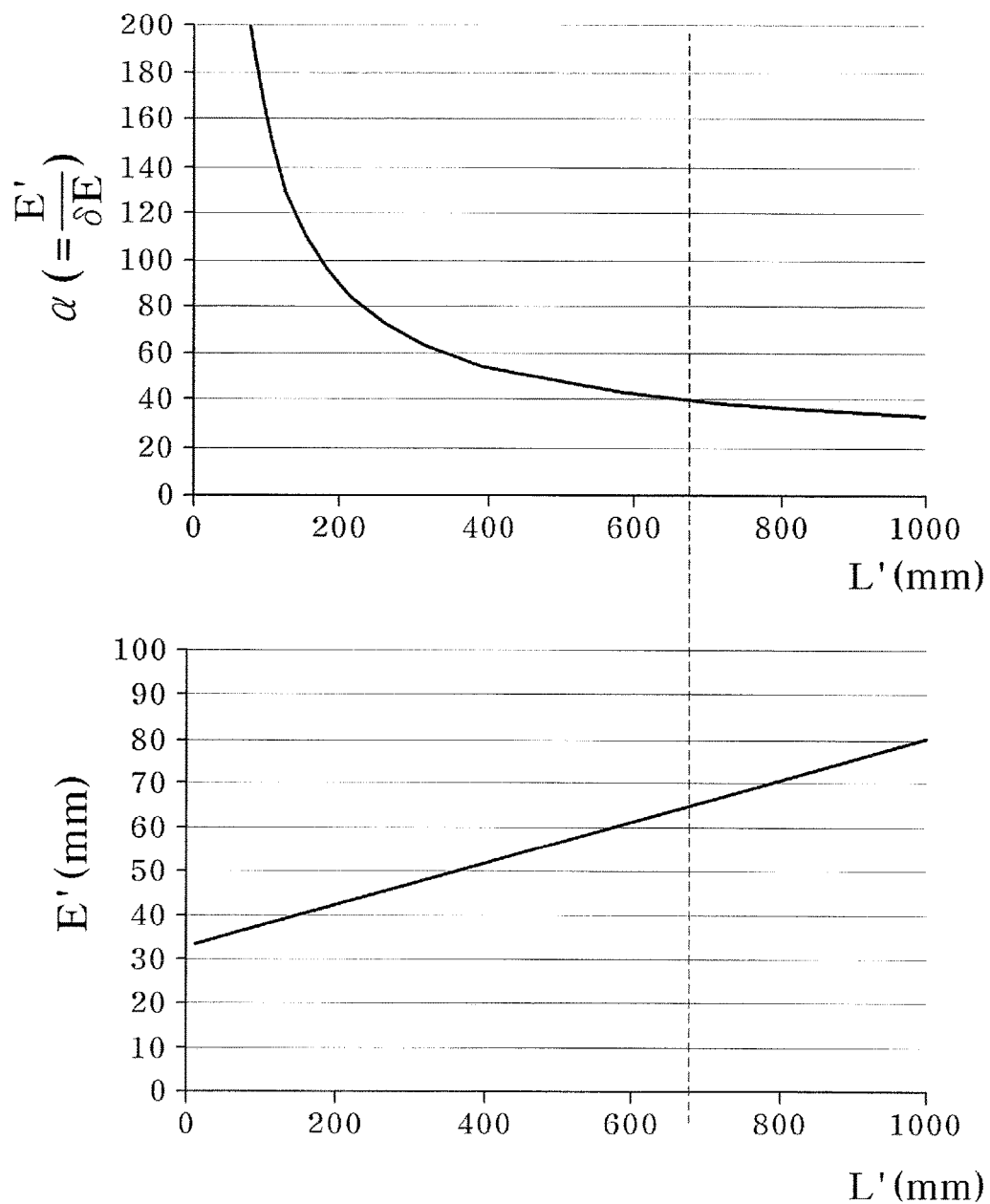

FIG. 21 is a simulation result with respect to changes in $\alpha$ and E' under the above-described design conditions during movement from one position of a common viewing zone formation range (L) to one position of a modified viewing zone range (L') in a depth direction. A position at which E'=65 mm, which is a limit in the depth direction of the modified viewing zone range, is located at about 680 mm. $\alpha$ is reduced during movement from a common viewing zone formation position to the depth direction position, but α is about 40 at a position where L'=680 mm to be in a range of an area in which an average amount of crosstalk of the modified common viewing zone can be ensured (see FIG. 15). Therefore, under the modified common viewing zone formation conditions using a commercial liquid crystal display apparatus, clear 3D images can be continuously viewed within a range of 680 mm in a depth direction that is the modified common viewing zone area beyond the OVD in which the common viewing zone is created, and within a minimum range of 660 mm in a horizontal direction even though a viewer freely moves. However, in a predetermined area from the common viewing zone formation position (L), a horizontal position at which the modified common viewing zone is not formed exists, and therefore the depth direction range may be reduced by excluding the predetermined area.

Figure 22:
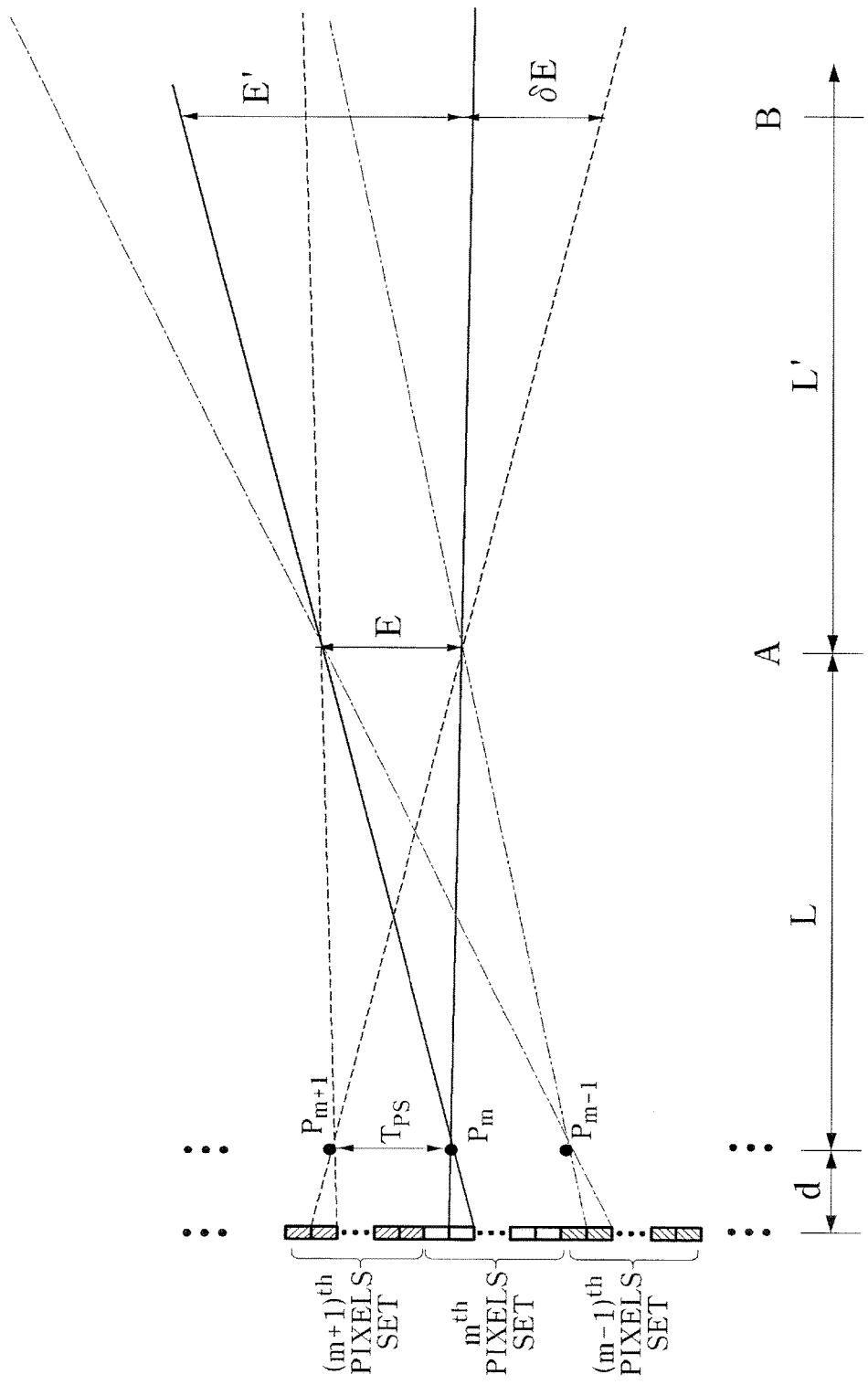
FIGS. 22 and 23 are a conceptual diagram for setting a range in a depth direction of a modified common viewing zone created beyond an OVD using a parallax barrier, and a graph showing α and E' during movement in a depth direction from the OVD.

As another example, FIG. 22 is a conceptual diagram for deriving a range of the modified common viewing zone area beyond an OVD in a case of using a parallax barrier. Openings of each parallax barrier are arranged so as to be separated at a predetermined interval (TPB) in a horizontal direction, and pixels of the display panel are arranged so as to be spaced apart from the openings by a predetermined distance (d). In this instance, in each pixel, viewpoint images are arranged by a control unit of an image display apparatus, and each viewpoint image is collected within a fixed predetermined area of a formation position (A) of the common viewing zone in the depth direction and then spread out. In this case, conditions of Equations 1 and 3, which are basic design conditions of the parallax barrier, may be equally applied. However, a size (E') of a modified unit viewing zone of an arbitrary specific position (B position) in a modified common viewing zone range (L') in the depth direction, a viewing zone formation horizontal position difference (δE) with an adjacent modified unit viewing zone, and a ratio α (=E'/δE) obtained from these are represented as the following Equations 18 to 20.

$$T_{PB}: L = \delta E : L' \quad \text{[Equations 18]}$$
$$\delta E = \frac{L' * T_{PB}}{L}$$

$$E: L = E': (L + L') \quad \text{[Equations 19]}$$
$$E' = \frac{L + L'}{L} * E$$

$$\alpha = \frac{E'}{\delta E} \quad \text{[Equation 20]}$$
$$= \frac{L + L'}{L' * T_{PB}} * E$$

A specific example with respect to a depth direction range of the modified common viewing zone satisfying the above-described relations of the parallax barrier will be described with reference to FIG. 23. It is assumed that the image display apparatus used in the design is a 30-inch display panel having 2560×1600 resolution, a pixel size thereof is 0.0835 mm, and pixels are black and white pixels which are not separated into RGB components. A horizontal size of the display panel is 641.28 mm. As 3D design conditions, the number of viewpoints (N) is 20, an OVD (L) is 700 mm, a size (E) of a unit viewpoint in the OVD is 33 mm, a period (TPB) of a parallax barrier is 1.6658 mm, and a distance (d) between the parallax barrier and the display panel is 1.771 mm. Under such conditions, a horizontal range (N*UVZ) of a central viewing zone in the OVD is 660 mm, which is larger than a horizontal size of the display panel. As a result, a horizontal range within the modified common viewing zone range is larger than a horizontal range of the central viewing zone in the OVD.

Figure 23:
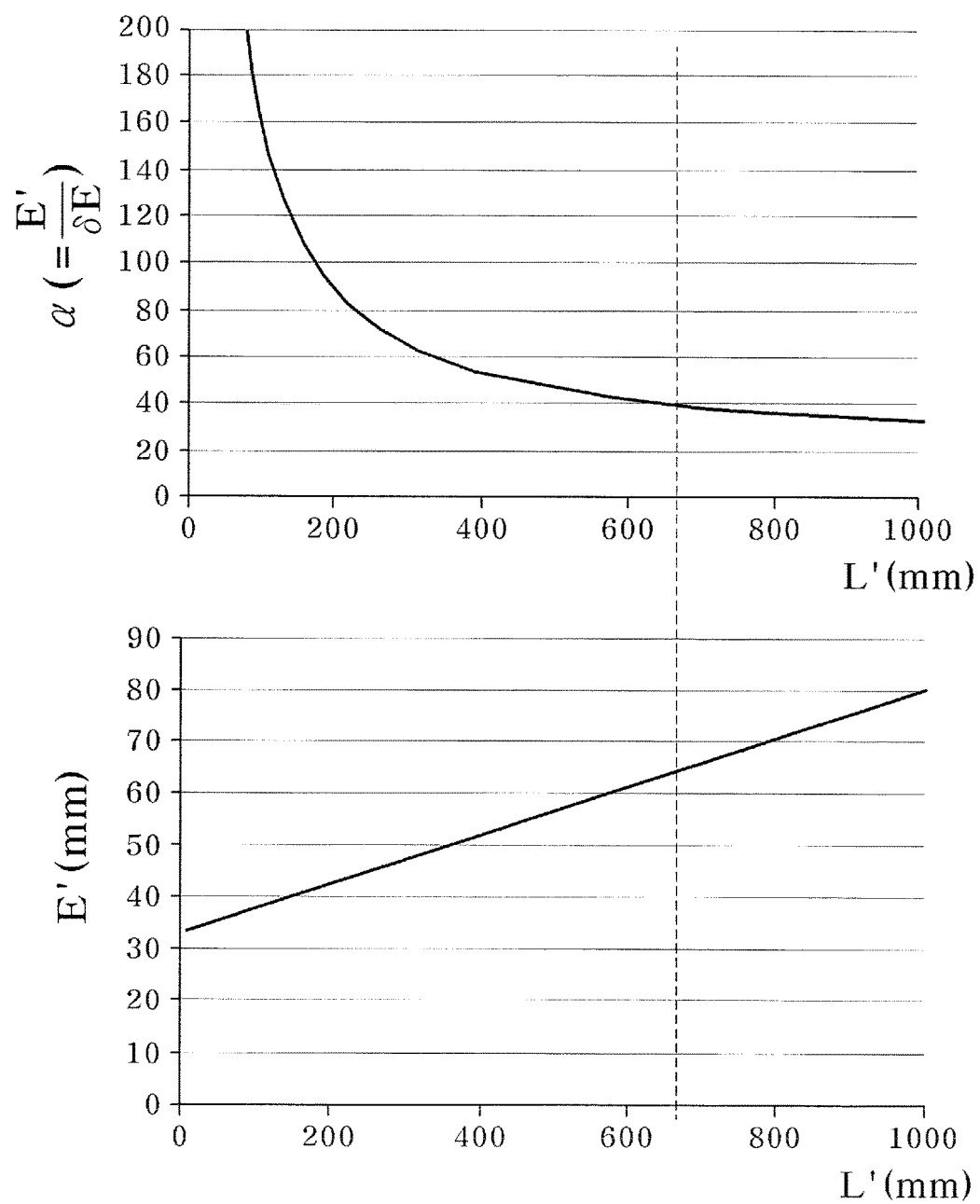

FIG. 23 is a simulation result with respect to changes in α and E' under the above-described design conditions during movement from one position of a common viewing zone formation range (L) to one position of a modified viewing zone range (L') in a depth direction. A position at which E'=65 mm, which is a limit in the depth direction of the modified viewing zone range, is located at about 680 mm. α is reduced during movement from a common viewing zone formation position to the depth direction position, but α is about 40 at a position where L'=680 mm to be in a range of an area in which an average amount of crosstalk of the modified common viewing zone can be ensured (see FIG. 10). Therefore, under the modified common viewing zone design conditions using a commercial liquid crystal display apparatus, clear 3D images may be continuously viewed within a range of 680 mm in a depth direction that is the modified common viewing zone area beyond the OVD in which the common viewing zone is created and within a minimum range of 660 mm in a horizontal direction, even though a viewer freely moves. However, in a predetermined area separated from the common viewing zone formation position (L), a horizontal position at which the modified common viewing zone is not formed exists, and therefore the depth direction range may be reduced by excluding the predetermined area.

The area of the modified common viewing zone that is created beyond the OVD according to the second embodiment of the present invention shows that an averaged amount of crosstalk can be ensured, but in order to reduce an absolute value of the average amount of crosstalk, the viewing zone for each viewpoint pixel that forms the modified common viewing zone should be formed to have a trapezoidal shape as described in the first embodiment of the present invention. This can be done by reducing the line width of the line light source to 30% or less compared to a unit pixel width, or reducing a width of an opening of the parallax barrier to 30% or less compared to the unit pixel width, as described with reference to FIGS. 14 and 16. In addition, by various methods other than the above-described method, the viewing zone for each viewpoint pixel that forms the modified common viewing zone may be formed to have a trapezoidal shape, and therefore uniform brightness and crosstalk in the modified common viewing zone area and low crosstalk with the level of the glasses type 3D image display apparatus can be realized.

FIG. 24 is a conceptual diagram explaining that the degree of freedom of a viewing position is increased by the multi-view 3D image display apparatus using the modified common viewing zone created beyond an OVD according to the first embodiment of the present invention. Referring to FIG. 24, when moving within a central viewing zone range, a viewer can view 3D images whose average crosstalk is 10% or less even without accurately tracking a pupil of the viewer like a general multi-view 3D image display apparatus. This equally applies to the multi-view 3D image display apparatus using the modified common viewing zone created beyond the OVD according to the second embodiment of the present invention.

In addition, even when moving further away, the viewer can view good quality 3D images using simple face tracking instead of accurate pupil tracking of the viewer like the general multi-view 3D image display apparatus. FIG. 25 is an exemplary diagram showing a case of performing face tracking in a 3D image display apparatus using a modified common viewing zone according to the present invention.

When a viewer moves horizontally out of a central viewing zone range, a tracking system of a face position or a head position of the viewer may track the face position of the viewer in real-time, and a control unit of the image display apparatus may rearrange viewpoint images in corresponding pixels in real-time to thereby move the central viewing zone range. That is, the face position of the viewer may be ascertained by performing face tracking or head tracking with respect to the viewer, and therefore the control unit may select an appropriate pixel set to provide viewpoint images. Accordingly, by moving the central viewing zone range, a face of the viewer may be allowed to be always in the central viewing zone range. Therefore, even using simple face tracking instead of high-accuracy pupil tracking, 3D images whose average crosstalk is 10% or less can be provided to the viewer as described above.

As described above, according to embodiments of the present invention, the modified common viewing zone between the common viewing zone of the multi-view 3D image display apparatus and the parallel viewing zone of the 3D image display apparatus employing the integral photography method can be created, and therefore uniform 3D images and crosstalk can be realized even though the viewer moves, and a uniform brightness area within the viewing zone for each viewpoint pixel can be enlarged, thereby reducing the average amount of crosstalk to the level of the glasses type 3D image display apparatus. According to another embodiment of the present invention, the modified common viewing zone area created in a predetermined area beyond the OVD in which the common viewing zone of the multi-view 3D image display apparatus is formed may be used, and the viewing zone for each viewpoint pixel that forms the modified common viewing zone may be formed in a trapezoidal shape, and therefore a uniform brightness area within each viewing zone can be enlarged. As a result, it is possible to provide uniform 3D images and crosstalk even though the viewer moves, and reduce the average amount of crosstalk to the level of the glasses type 3D image display apparatus. In addition, through face tracking instead of accurate pupil tracking, images can be rearranged in pixels according to the face position of the viewer, and therefore 3D images can be viewed without inverse stereoscopic vision even while the viewer moves.

It will be apparent to those skilled in the art that various modifications can be made to the above-described exemplary embodiments of the present invention without departing from the spirit or scope of the invention. Thus, it is intended that the present invention cover all such modifications that fall within the scope of the appended claims and their equivalents.

What is claimed is:

1. A multi-view three-dimensional (3D) image display apparatus, comprising:
   a display panel in which pixels are arranged;
   a parallax separation means arranged so as to be spaced apart from the display panel; and
   a control unit configured to control formation of a modified common viewing zone in which viewing zones for each viewpoint pixel are arranged in a space, by viewpoint images created by the pixels of the display panel and the parallax separation means,
   wherein, in the modified common viewing zone, a first horizontal position of a viewing zone for each first viewpoint pixel created by a first pixel set on the display panel providing the viewpoint image and a first position of the parallax separation means corresponding to the first pixel set, and a second horizontal position of a viewing zone for each second viewpoint pixel created by a second pixel set adjacent to the first pixel set and a second position of the parallax separation means corresponding to the second pixel set, are not the same;
   wherein the parallax separation means is a parallax barrier or a lenticular lens, and a slit interval of the parallax barrier or a pitch T' of the lenticular lens is larger than T of the multi-view 3D image display apparatus using a common viewing zone and smaller than T of a 3D image display apparatus employing an integral photography method; and
   wherein the slit interval of the parallax barrier or the pitch T' of the lenticular lens is represented as the following Equation 6, where Wp denotes a pixel width, N denotes the number of viewpoints, E denotes a viewpoint interval, and δE denotes a horizontal position difference of a viewing zone created by a slit of an adjacent parallax barrier or the lenticular lens $$T' = \frac{W_p}{W_p + E}(N \times E + \delta E).$$ [Equation 6]

2. The multi-view 3D image display apparatus of claim 1, wherein a light intensity distribution of the viewing zone for each viewpoint pixel is a trapezoidal distribution in which brightness of a middle area of the viewing zone is uniform within a predetermined range, and wherein a width of an opening of the parallax barrier is 30% or less (not including 0) compared to a pitch of the pixels of the display panel.

3. The multi-view 3D image display apparatus of claim 1, further comprising:
   a tracking system of a face position or a head position of a viewer, wherein the control unit adjusts a horizontal position of a central viewing zone of the modified common viewing zone by re-arranging the viewpoint image in the pixels according to a position of the viewer, using face or head tracking information provided from the tracking system.

4. The multi-view 3D image display apparatus of claim 1, wherein a ratio α of a horizontal position difference (δE) of a horizontal position of the viewing zone for each second viewpoint pixel to a horizontal position of the viewing zone for each first viewpoint pixel is 8 or larger.

5. The multi-view 3D image display apparatus of claim 1, wherein ΔCrosstalk, a change width of an amount of crosstalk within the modified common viewing zone is 10% or less.

6. A multi-view three-dimensional (3D) image display apparatus, comprising:
   a display panel in which pixels are arranged;
   a line light source arranged so as to be spaced apart from the display panel; and
   a control unit configured to control formation of a modified common viewing zone in which viewing zones for each viewpoint pixel are arranged in a space, by viewpoint images created by the pixels of the display panel and the line light source,
   wherein, in the modified common viewing zone, a first horizontal position of a viewing zone for each first viewpoint pixel created by a first pixel set on the display panel providing the viewpoint image and a first position of the line light source corresponding to the first pixel set, and a second horizontal position of a viewing zone for each second viewpoint pixel created by a second pixel set adjacent to the first pixel set and a second position of the line light source corresponding to the second pixel set, are not the same wherein a pitch T' of the line light source is smaller than T of the multi-view 3D image display apparatus using a common viewing zone and larger than T of a 3D image display apparatus employing an integral photography method; and wherein the pitch T' of the line light source is represented as the following Equation 12, where Wp denotes a pixel width, N denotes the number of viewpoints, E denotes a viewpoint interval, and δE denotes a horizontal position difference of a viewing zone created by an adjacent line light source $$T' = \frac{W_p}{E - W_p}(N * E - \delta E). \quad \text{[Equation 12]}$$

7. The multi-view 3D image display apparatus of claim 6, wherein a light intensity distribution of the viewing zone for each viewpoint pixel is a trapezoidal distribution in which a brightness of a middle area of the viewing zone is uniform within a predetermined range, and wherein a line width of the line light source is 30% or less (not including 0) compared to a pitch of the pixels of the display panel.

8. The multi-view 3D image display apparatus of claim 6, further comprising:
   a tracking system of a face position or a head position of a viewer, wherein the control unit adjusts a horizontal position of a central viewing zone of the modified common viewing zone by re-arranging the viewpoint image in the pixels according to a position of the viewer, using face or head tracking information provided from the tracking system.

9. The multi-view 3D image display apparatus of claim 6, wherein a ratio α of a horizontal position difference (δE) of a horizontal position of the viewing zone for each second viewpoint pixel to a horizontal position of the viewing zone for each first viewpoint pixel is 8 or larger.

10. The multi-view 3D image display apparatus of claim 6, wherein ΔCrosstalk, a change width of an amount of crosstalk within the modified common viewing zone is 10% or less.

* * * * *